(12) United States Patent
Farinacci et al.

(10) Patent No.: US 7,720,019 B1
(45) Date of Patent: May 18, 2010

(54) SMALL GROUP MULTICAST IN A COMPUTER NETWORK

(75) Inventors: Dino Farinacci, San Jose, CA (US); Joel Bion, Saratoga, CA (US); Alex Tweedly, Argyll (GB); Mike Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 683 days.

(21) Appl. No.: 11/342,388

(22) Filed: Jan. 27, 2006

Related U.S. Application Data

(63) Continuation of application No. 09/515,295, filed on Feb. 29, 2000, now Pat. No. 7,016,351.

(51) Int. Cl.
H04H 20/71 (2008.01)
H04L 12/56 (2006.01)
H04J 3/26 (2006.01)

(52) U.S. Cl. .................. 370/312; 370/390; 370/432
(58) Field of Classification Search .................. 370/312, 370/389–393, 396, 399, 401, 432
See application file for complete search history.

(56) References Cited

U.S. PATENT DOCUMENTS

| | | | |
|---|---|---|---|
| 4,821,265 A | 4/1989 | Albal et al. | |
| 4,864,559 A | 9/1989 | Perlman | |
| 4,893,302 A | 1/1990 | Hemmady et al. | |
| 4,933,937 A | 6/1990 | Konishi | |
| 5,018,137 A | 5/1991 | Backes et al. | |
| 5,027,350 A | 6/1991 | Marshall | |
| 5,088,032 A | 2/1992 | Bosack | |
| 5,138,615 A | 8/1992 | Lamport et al. | |
| 5,140,585 A | 8/1992 | Tomikawa | |
| 5,274,631 A | 12/1993 | Bhardwaj | |
| 5,304,992 A | 4/1994 | Harashima | |
| 5,305,311 A | 4/1994 | Lyles | |
| 5,313,454 A | 5/1994 | Bustini et al. | |
| 5,331,637 A | 7/1994 | Francis et al. | |
| 5,361,256 A | 11/1994 | Doeringer et al. | |
| 5,394,394 A | 2/1995 | Crowther et al. | |
| 5,394,402 A | 2/1995 | Ross | |
| 5,414,704 A | 5/1995 | Spinney | |

(Continued)

OTHER PUBLICATIONS

Cisco 7000 Series Gains Fast Ethernet Interface, Becomes Only Router Family to Support Three High-Speed Network Types, http://www.cisco.com/warp/public/146/199.html, Mar. 28, 1995, pp. 1-2.

(Continued)

Primary Examiner—Tri H Phan
(74) Attorney, Agent, or Firm—Cesari and McKenna, LLP

(57) ABSTRACT

A network packet is encapsulated and has at least one field in the header of the encapsulation. A multicast delivery tree is written into a field of the encapsulating header. A method for operating a router to use the multicast delivery tree encapsulated in the header of the network packet has the following steps. The router receives a packet from a computer network, the packet having an encapsulated field. The router then reads a multicast delivery tree from the encapsulated field, the multicast delivery tree having a route to each of a plurality of destination stations. Then, the router forwards the packet to an address selected in response to the multicast delivery tree.

34 Claims, 15 Drawing Sheets

U.S. PATENT DOCUMENTS

| | | | |
|---|---|---|---|
| 5,418,779 | A | 5/1995 | Yemini et al. |
| 5,420,862 | A | 5/1995 | Perlman |
| 5,430,715 | A | 7/1995 | Corbalis et al. |
| 5,473,607 | A | 12/1995 | Hausman et al. |
| 5,500,860 | A | 3/1996 | Perlman et al. |
| 5,511,168 | A | 4/1996 | Perlman et al. |
| 5,548,585 | A | 8/1996 | Lagoutte et al. |
| 5,612,959 | A | 3/1997 | Takase et al. |
| 5,617,421 | A | 4/1997 | Chin et al. |
| 5,633,858 | A | 5/1997 | Chang et al. |
| 5,633,869 | A | 5/1997 | Burnett et al. |
| 5,636,216 | A | 6/1997 | Fox et al. |
| 5,673,263 | A | 9/1997 | Basso et al. |
| 5,684,800 | A | 11/1997 | Dobbins et al. |
| 5,740,171 | A | 4/1998 | Mazzola et al. |
| 5,742,604 | A | 4/1998 | Edsall et al. |
| 5,752,003 | A | 5/1998 | Hart |
| 5,754,547 | A | 5/1998 | Nakazawa |
| 5,764,636 | A | 6/1998 | Edsall |
| 5,796,732 | A | 8/1998 | Mazzola et al. |
| 5,796,740 | A | 8/1998 | Perlman et al. |
| 5,835,720 | A | 11/1998 | Nelson et al. |
| 5,854,901 | A | 12/1998 | Cole et al. |
| 5,881,246 | A | 3/1999 | Crawley et al. |
| 5,901,286 | A | 5/1999 | Danknick et al. |
| 5,910,955 | A | 6/1999 | Nishimura et al. |
| 5,946,316 | A | 8/1999 | Chen et al. |
| 5,968,126 | A | 10/1999 | Ekstrom et al. |
| 5,982,773 | A | 11/1999 | Nishimura et al. |
| 5,999,536 | A | 12/1999 | Kawafuji et al. |
| 6,055,236 | A | 4/2000 | Nessett et al. |
| 6,078,590 | A | 6/2000 | Farinacci et al. |
| 6,321,270 | B1 | 11/2001 | Crawley |
| 6,347,090 | B1 | 2/2002 | Ooms et al. |
| 6,370,142 | B1 | 4/2002 | Pitcher et al. |
| 6,374,303 | B1 * | 4/2002 | Armitage et al. ............ 709/242 |
| 6,389,475 | B1 | 5/2002 | Speakman et al. |
| 6,415,312 | B1 * | 7/2002 | Boivie ........................ 709/200 |
| 6,502,140 | B1 * | 12/2002 | Boivie ........................ 709/238 |
| 6,557,111 | B1 | 4/2003 | Theimer et al. |
| 6,611,528 | B1 * | 8/2003 | Farinacci et al. ............ 370/432 |
| 6,611,872 | B1 | 8/2003 | McCanne |
| 6,625,773 | B1 | 9/2003 | Boivie et al. |
| 6,654,371 | B1 | 11/2003 | Dunstan et al. |
| 6,728,777 | B1 * | 4/2004 | Lee et al. ..................... 709/238 |
| 6,757,294 | B1 * | 6/2004 | Maruyama .................. 370/432 |
| 7,304,955 | B2 * | 12/2007 | Lee ............................ 370/237 |
| 7,310,335 | B1 * | 12/2007 | Garcia-Luna-Aceves et al. . 370/390 |
| 2005/0201278 | A1 * | 9/2005 | Banerjee et al. ............. 370/229 |
| 2006/0187950 | A1 * | 8/2006 | Bou-Diab et al. ........... 370/432 |
| 2006/0203819 | A1 * | 9/2006 | Farinacci et al. ............ 370/390 |
| 2007/0189291 | A1 * | 8/2007 | Tian ........................... 370/390 |

OTHER PUBLICATIONS

ISL Functional Specification, http://www.cisco.com/warp/public/741/4.htm, Apr. 8, 1996, pp. 1-4.

Configuring VTP and Virtual LANs, Catalyst 5000 Series Software Configuration Guide, Chapter 13, 1998, pp. 13-24.

ISL Configurations for Cisco IOS and the Catalyst 5000, http://www.cisco.com/warp/public/741/8.html, Apr. 29, 1999, pp. 1-7.

IEEE Standard Project P802.1Q, Draft Standard for Virtual Bridged Local Area Networks, Feb. 28, 1997, pp. 1-88, IEEE.

Draft Standard P. 802.1Q/D10, IEEE Standards for Local and Metropolitan Area Networks: Virtual Bridged Local Area Networks, Mar. 22, 1998, pp. 1-212, IEEE.

Dynamic Inter-Switch Link Protocol, 2.2 Configuration Note, 1997, pp. 2-6.

Virtual LANs, Catalyst 2820 Series and Catalyst 1900 Series Enterprise Edition Software Configuration Guide, Chapter 2, 1998, pp. 2-1—2-49.

IEEE, "Draft Standard for Virtual Bridged Local Area Networks," P802.1Q/D6, May 16, 1997, pp. 1-10 and 70-72.

Deering, S., and Cheriton, D., "Multicast Routing in Datagram Internetworks and Extended LANs," vol. 8, No. 2, ACM Transactions on Computer Systems, May 1990, pp. 85-110.

Deering, S. et al., "An Architecture for Wide-Area Multicast Routing," Proceedings of SIGCOMM '94 Conf., ACM, Oct. 1994, pp. 126-135.

"Cisco Catalyst Workgroup Switch Version 3.0," http://www.cisco.com/warp/public/558/16.html, Aug. 29, 1994, pp. 1-5.

"Virtual Networking Services," http://www.cisco.com/warp/public/614/5.html, Oct. 28, 1997, pp. 1-11.

"The Virtual LAN Technology Report," http://www.3com.com/nsc/200374.html, 1998, pp. 1-23.

"ATM Internetworking," http://www.cisco.com/warp/public/614/12.html, Jun. 1, 1995, pp. 1-74.

Lucent's and Prominet's Motion for Leave to Amend Their Amended Complaint, with Exhibits being filed in *Lucent Technologies, Inc. and Prominet Corporation v. Cisco Systems, Inc. and Cisco Technology, Inc.* Civil Action No. 98-349 (JJF), Sep. 1998, 23 pgs.

"Catalyst 1200 Release 4.0," http://www.cisco.com/warp/public/558/49.html, Dec. 3, 1998, pp. 1-7.

"Cisco IOS VLAN Services," http://www.cisco.com/warp/public/614/11.html, Jan. 21, 1998, pp. 1-4.

"Cisco IOS Technologies," http://www.cisco.com/warp/public/732/ciscoios.html, 1997, pp. 1-2.

"Cisco LAN Switching Products," http://www.cisco.com/warp/public/534/16.html, May 20, 1999, pp. 1-22.

"Multicast Routing," http://www.cisco.com/warp/public/614/17.html, Mar. 19, 1999, pp. 1-4.

"IP Multicast Streamlines Delivery of Multicast Applications," http://www.cisco.com/warp/public/674/4.html, Feb. 24, 1998, pp. 1-5.

"Cisco Announces New Fast Ethernet Interface," Communications Industry Researchers, Broadband Networks and Applications, Apr. 15, 1995, pp. 2-3.

Lucent Technologies, Inc.'s Initial Disclosure of Prior Art under Civil Local Rule 16-7, filed in Case No. C98-20836JW(PVT) ENE, dated Nov. 18, 1998, 6 pgs.

"Cisco Introduces VLAN Solution," Communications Industry Researchers, Broadband Networks and Applications, Apr. 15, 1995, pp. 6-7.

"Cisco Announces Token-Ring Switching Products," Communications Industry Researchers, Broadband Networks and Applications, Apr. 15, 1995, pp. 4-5.

"Chipcom and Cisco to Collaborate on ATM Networking Solutions," Communications Industry Researchers, Broadband Networks and Applications, Apr. 15, 1995, pp. 3-4.

"Cisco VLAN Roadmap", http://www.cisco.com/warp/public/538/7.html, Jul. 17, 1995, pp. 1-5.

Obraczka, K. et al., "Multicast Routing Issues in Ad Hoc Network", Universal Personal Communications, 1998, ICUPC '98, IEEE 1998, vol. 1, Oct. 5-9, 1998, pp. 751-756.

* cited by examiner

300

| ENTRY | PARENT | ENTRY ADDRESS | PARENT ADDRESS |
|---|---|---|---|
| 1 | 0 | R1 | (ROOT) |
| 2 | 1 | R2 | R1 |
| 3 | 2 | R3 | R2 |
| 4 | 2 | R5 | R2 |
| 5 | 4 | R6 | R5 |
| 6 | 4 | R7 | R5 |
| 7 | 2 | R8 | R2 |
| 8 | 7 | R9 | R8 |

| ENTRY | PARENT | ENTRY ADDRESS | PARENT ADDRESS |
|---|---|---|---|
| 1 | 0 | R3 | (ROOT) |
| 2 | 0 | R5 | (ROOT) |
| 3 | 2 | R6 | R5 |
| 4 | 2 | R7 | R5 |
| 5 | 0 | R8 | (ROOT) |
| 6 | 5 | R9 | R8 |

| ENTRY | DEPTH | ENTRY ADDRESS |
|---|---|---|
| 1 | 0 | R1 |
| 2 | 1 | R2 |
| 3 | 2 | R3 |
| 4 | 2 | R5 |
| 5 | 3 | R6 |
| 6 | 3 | R7 |
| 7 | 2 | R8 |
| 8 | 3 | R9 |

FIG. 5

PRUNE MESSAGE

TRACE ACK

SMALL GROUP MULTICAST IN A COMPUTER NETWORK

RELATED APPLICATIONS

This application is a continuation of U.S. patent application Ser. No. 09/515,295 filed on Feb. 29, 2000, now issued as U.S. Pat. No. 7,016,351.

FIELD OF THE INVENTION

This invention relates to multicast of packets from a single source station to a plurality of destination stations, and more particularly to multicasting to a small group of destination stations.

BACKGROUND

Multicast of computer packets from a source station to a plurality of destination stations has been provided for in standard computer engineering since the early days of computer networking, as illustrated by the description by Radia Perlman in her book *Interconnections*, published by Addison Wesley, Copyright date 1992, all disclosures of which are incorporated herein by reference, particularly at page 26 where the group/individual bit at the last position of the first octet of the destination address is discussed.

A multicast session conducted over a large computer network requires that routers route packets from the source station to the various destination stations. For example, a router receiving a multicast packet may have many ports through which it could route the packet, but it is wasteful of network bandwidth for the router to transmit the packet on any port which does not reach a multicast destination station. Accordingly, routers must maintain state information for multicast groups so that the router will "know" which ports to which it should route the multicast packets received by the router. Multicast addresses use a plurality of bits to indicate a group number, and so the router must maintain lists of multicast groups, along with the ports to which a received packet must be routed. With many multicast groups being transmitted over a large computer network, such as for example, the worldwide Internet, the amount of state information which a router must store becomes too large to be easily managed. Accordingly, conventional multicast systems are limited by the storage capacity of routers in the number of simultaneous multicast sessions which they can maintain.

Conventional multicast builds a tree structure from the source of a multicast stream to the destination stations of that stream. The collection of multiple destination stations is known as a multicast group. A multicast group may have one or more stations supplying the multicast packets. Multicast packets are forwarded from the source down the tree by each intervening router. Each router contains state information to determine the next hop forwarding destination(s) for a packet. For each source/group pair [S, G] the router holds information describing the expected inbound interface and the set of outbound interfaces. Where there are multiple outbound interfaces, the packet is duplicated and forwarded over each interface.

It is attractive to consider the use of multicast to provide applications such as n-way voice and video conferencing. Clearly the numbers of groups required by such applications when widely deployed could reach millions. However, the state information scaling problem rules out conventional multicast for such applications.

A possible solution is to encode the wrapper with only the final destination addresses, either end stations or routers. However, this method imposes a requirement on all intermediate routers implementing the method to perform processing effort in looking at these addresses. This additional processing effort makes such a scheme unsatisfactory.

There is needed a multicast system which can scale to millions of multicast groups, and not overload intermediate routers with state information or additional route lookup processing.

SUMMARY OF THE INVENTION

The invention solves the problem of overloading intermediate routers with state information as the number of multicast groups increases to millions of groups. The invention places multicast delivery tree information in the header of an encapsulated multicast packet, thereby relieving the routers from maintaining any state information about the multicast groups. The encapsulated packet is referred to as a small group is multicast packet, or SGM packet. Routers which are neither branch points of the, delivery tree nor destination routers will also need to do no additional forwarding processing other than that needed for standard unicast forwarding. A protocol designation field in the Layer 3 header informs the router that the packet is a SGM packet, and that the router is therefore instructed to parse the packet for route information. The router parses the SGM packet header and determines the next hop address of routers in the multicast delivery tree. The standard unicast forwarding tables are then consulted to determine the next packet destination addresses, and the router then rewrites the SGM packet and routes it to the next hop router. The routing tables also instruct the router as to which outbound port to route the packet.

In more detail, the source end station writes the multicast group number into a data packet. A router, known as the SGM source router, receives the multicast packet and writes the multicast delivery tree information into the packet. The SGM source router then encapsulates the packet as a SGM packet with a SGM indicator in the type field, and transmits the SGM packet to the next router in the multicast delivery tree. The next router, in response to reading the SGM indicator in the type field, then parses the multicast delivery tree information written into the SGM packet, learns the new next router in the multicast delivery tree, and then transmits the SGM packet to the new next router. The final router in the multicast delivery tree, also known as the egress router or the destination router, then rewrites the original multicast packet and transmits it through a port which can reach the intended destination end station. Further, a packet may be replicated and transmitted through a plurality of ports on an intermediate router. So, an intermediate router may be intermediate on one port, while a final router on another port if an end station connects to that port.

Setup of the multicast delivery tree is accomplished as follows. The destination end station determines the group number and source end station address of a multicast group which it wants to join, in response to actions taken by a person using the destination end station. The destination end station informs a nearby router of the multicast group number which it wants to join, and that router becomes the egress router or destination router for that destination end station for that multicast group. The egress router then transmits trace packets to the source end station of the multicast group. A router receiving the trace packet writes its own address into an address list in the trace packet, and then routes the trace packet on toward the multicast group source end station. A router near the multicast group source end station receives the trace packet and becomes the source router for that multicast group for that destination end station. The source router then begins receiving multicast data packets from the source end station, encapsulating the multicast data packets with a multicast delivery tree read from the address list written into the trace packet, and routing the encapsulated SGM packets along the multicast delivery tree.

Alternatively, the source end station may perform all of the encapsulation tasks, and the destination end station may perform the de-encapsulation tasks.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 3 is a table showing parent address encoding.

FIG. 4 is a reduced table showing parent address encoding.

FIG. 5 is a table showing depth encoding.

DETAILED DESCRIPTION

Figure 1:
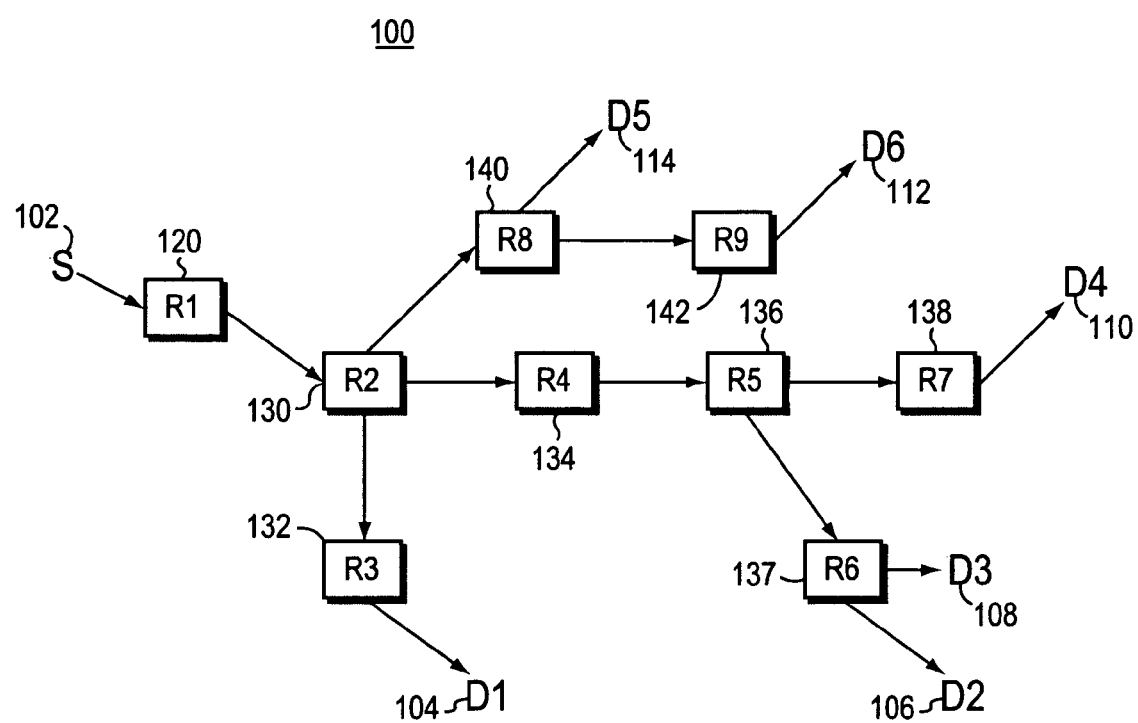
FIG. 1 is a block diagram of a computer network.

Turning now to FIG. 1, computer network 100 is shown. Source station S 102 transmits data packets to destination stations D1 104, D2 106, D3 108, D4 110, D5 114, and D6 112 by means of a multicast session. Destination stations D1 . . . D6 are the multicast group of destination station. Router R1 120 is the ingress (or encapsulation) router, and routers R3 132, R6 137, R7 138, R8 140 and R9 142 are the egress (or destination) routers. The delivery tree to reach all the destinations (D1 to D6) is indicated by the arrows. When R1 120 receives a packet from source S 102 addressed to the multicast group from source station S, it encapsulates the multicast packet in a unicast packet addressed to the first hop router R2 and includes in the packet a header which describes the required delivery tree. Note that the delivery tree need only include the routers that are either branch points (R2, R5, R8) in the tree, or delivery points (R3, R6, R7, R9). An intervening router, such as router R4 above, need not be included in the specification of the delivery tree. On receiving such a unicast packet, a router inspects the header to determine the next hop routers and duplicates the packet, adjusting the unicast destination address of each packet to be the next hop IP address.

Forwarding of packets from router to router proceeds as follows.

R1 120 forwards to R2 130

R2 130 forwards to R3 132, R5 136, and R8 140

R5 136 forwards to R6 137 and R7 138

R8 140 forwards to R9 142

Routers actively involved in the Small Group Multicast (SGM) delivery tree such as routers R1, R2, R3, R5, R6, R7, R8, R9 must be SGM capable. By being SGM capable is meant that the routers run software which recognizes SGM packets and take appropriate action based upon parsing the SGM header.

Router R2 130 need not forward to R4 134, as the packets forward to R5 136 will be transparently routed by router R4 134. On reaching a destination router, the packet is decapsulated and the original multicast packet is forwarded to the final multicast destination(s) station(s) using normal multicast methods.

The details of the packet encoding and forwarding are described with reference to FIG. 2, where data packet header 200 is shown. Only the encapsulating router, R1 120, is required to maintain state concerning the delivery tree. The remaining intervening routers merely forward based on the information in the header 200. The information to build the delivery tree is acquired by the encapsulating router, by each destination router sending a 'trace' packet, as discussed with reference to FIG. 9, towards the source. As the trace packet traverses the network it records the address of each SGM capable router traversed. So in the above example, R1 would receive the trace packets from destination stations D1, D2, D3, D4, D5, and D6 showing delivery tree paths as follows:

(D1) having delivery tree path R3, R2, R1

(D2, D3) having delivery tree path R6, R5, R4, R2, R1

(D4) having delivery tree path R7, R5, R4, R2, R1

(D5) having delivery tree path R8, R2, R1

(D6) having delivery tree path R9, R8, R2, R1

By combining the information carried by the trace packets, the delivery tree may be built for inclusion in multicast data packets. The delivery tree may eliminate any redundant, non-branching nodes, such as router R4 above, even if R4 is SGM capable.

In order to send the trace packets, the destination routers must know the source(s) of the group. Techniques for destination routers to learn the source of a desirable multicast group are discussed hereinbelow.

Destination routers handle recovery from failures by re-sending trace packets when no traffic for the group has arrived after some period. In the absence of genuine traffic the encapsulating router sends periodic heartbeat traffic to inhibit the trace packets from still connected nodes. Details of these mechanisms are described hereinbelow.

Figure 2A:
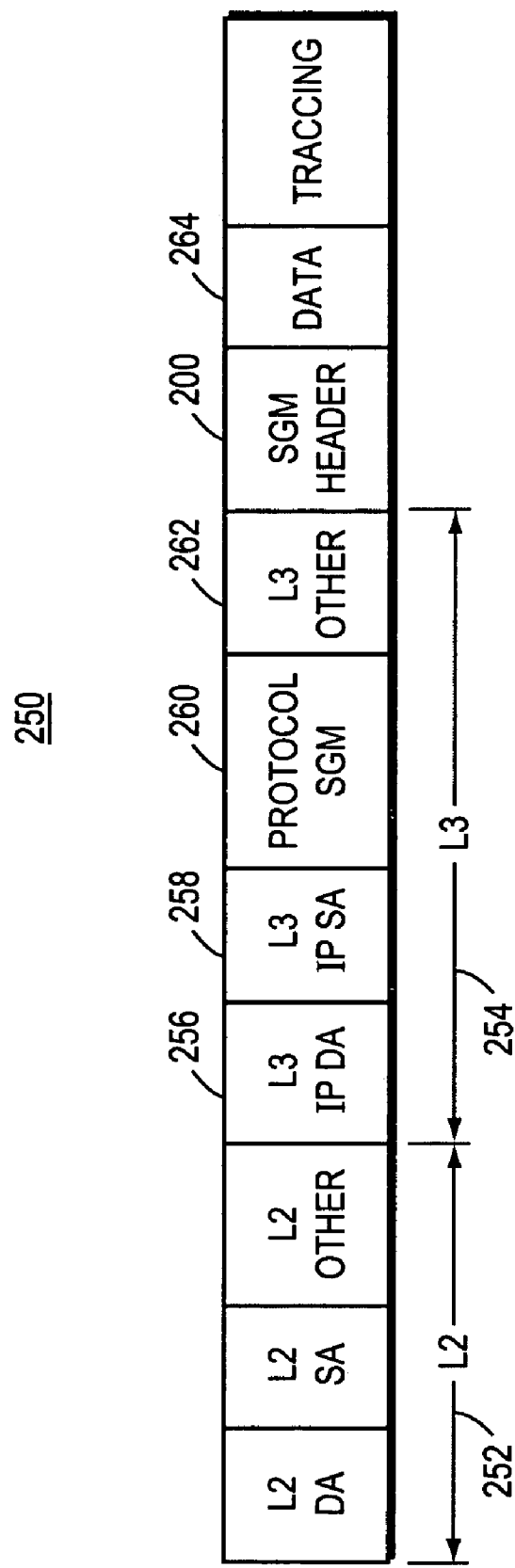
FIG. 2A is field diagram of a multicast packet.

Turning now to FIG. 2A, fields of multicast data packet 250 are shown. Multicast packets are encapsulated in a standard unicast packet having Layer 2 fields 252 and Layer 3 fields 254 as follows:—

Destination IP address 256=IP address of first hop router

Source IP address 258=IP address of encapsulating router

Protocol 260=SGM (a new protocol type value assigned to small group multicast)

TTL=TTL from multicast packet (minus 1).

ToS=copied from multicast packet

Figure 2B:
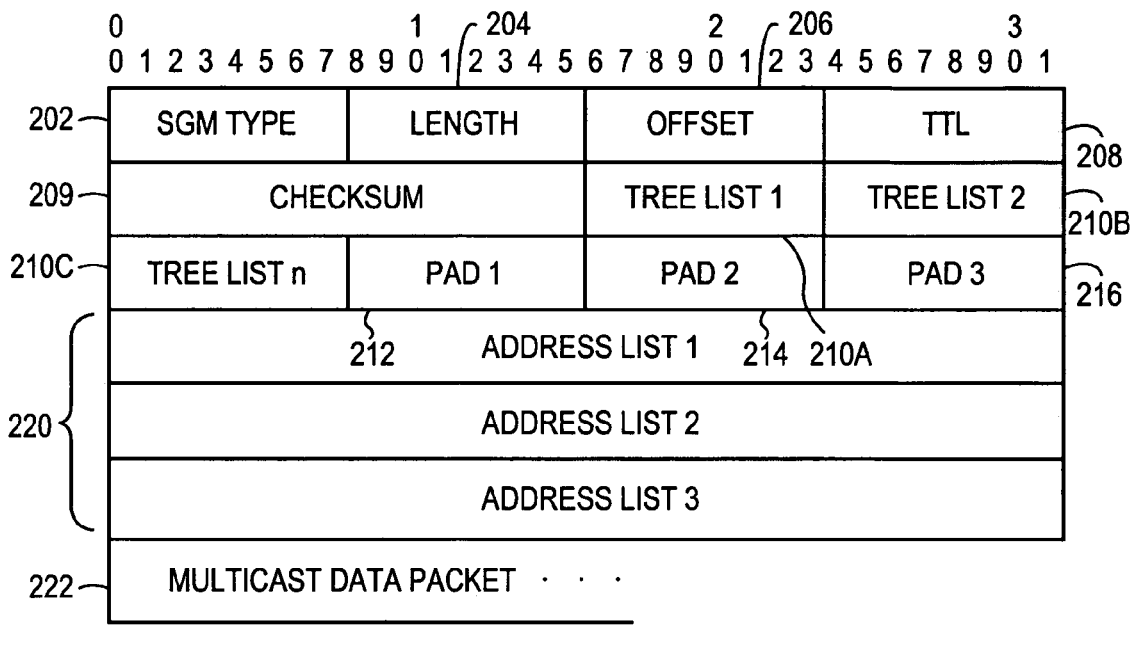
FIG. 2B is a field diagram of a SGM header on a multicast packet.

Following the Layer 3 fields 254 is the SGM header fields 200. Turning now to FIG. 2B, SGM header 200 fields are shown.

ToS refers to the Type of Service, or precedence, which is written into a header of a data an IP data packet. This parameter is used, in some instances, to establish a Quality of Service provided by a network device. This field is copied from the ordinary multicast packet into the SGM packet.

The data portion of the unicast packet contains a Small Group Multicast (SGM) to header shown in FIG. 2, and as described below, followed by the original multicast packet in data field 264.

SGM Header Format

The SGM Header Contains the Following Fields

SGM type 202—Type of SGM packet (1 byte).

The SGM Type allows for different SGM packets (e.g. prune, trace-ACK). An SGM data packet is assigned type=128. The high order bit is set to indicate that the packet contains an SGM route and should be processed using SGM forwarding.

Length 204, or No. of nodes. —The number of addresses in the address list (1 byte). The offset to the start of the address list (a) is therefore ceiling ((6+n)/4) 32 bit words and hence the total length of the SGM header (i.e. the offset to the start of the encapsulated multicast data packet) is (a+n). Using one byte allows 255 nodes.

Offset 206—The numerical offset of the receiving node's entry in the tree list (1 byte). This is initialized to 0 for delivery to the first hop router, since the first hop router's address does not appear in the list.

Alternatively, the Offset byte could be omitted and the header simply searched for the receiving node's IP address. Doing so would reduce the header size by one byte and remove the need to update the header when forwarding the packet, however omitting the Offset byte would make the forwarding decision less efficient.

TTL 208—Normally indeterminate, but used when forwarding over a layer 2 multicast capable subnetwork.

Checksum field 209. The SGM checksum field covers the original multicast source and destination addresses as well as the preceding SGM header fields.

Tree lists 210A, 210B, 210C,—The list describing the delivery tree (n bytes, where n is the number of entries in the tree list).

Padding—Padding is represented by fields Pad1 212, Pad2 214, Pad3 216, in order to start the Address list on 4-byte boundary.

Address list 220—The list of IP addresses for the delivery tree (4n bytes) There is an address list for each receiving station. Address lists 220 represent a list for each receiving station, for example Address list 1, address list 2, address list 3, etc.

The SGM header is followed by the original multicast Data Packet 222.

An alternative would be to interleave the tree entries and IP addresses (so that the corresponding IP address is adjacent to its tree entry). While this might appear more natural, and may give some slight benefit in localising memory references once a node has been located, the lack of 4-byte alignment of the IP addresses, coupled with poor localisation of memory references while searching the tree (the IP address is only referenced once the next hop node has been found), combine to make this a less efficient structure.

Parent Encoding

Turning now to FIG. 3, route table 300 for the parent encoding method is shown. The tree list may be encoded in one of two forms, "parent encoding" or "depth encoding". Parent encoding is adopted as the preferred embodiment, and depth encoding is described as an alternative embodiment hereinbelow.

In parent encoding form, each entry in the list describes the entry number of that entry's parent. Thus the example tree above would be represented as 0, 1, 2, 2, 4, 4, 2, 7 where the address list is

R1, R2, R3, R5, R6, R7, R8, R9

An entry of zero indicates that this node's parent is the root of the tree.

Parent encoding is interpreted as shown in FIG. 3.

The entries are enumerated in column 302. The router being addressed is listed in column 304. The parent of the router listed in column 304 is listed in column 306. The address of the parent is listed in column 308. As an example, entry 5 310 is for router R6 132, the parent of router R6 132 is router R5 136, as is shown in column 308 for entry 310 into table 300.

In operation, it is not necessary to include information about R1 in the tree, since R1 is the encapsulation node. Similarly it is not necessary to include information about R2 in the tree, since the packet is unicast addressed to that node. Hence the information actually included in the packet would be just.

0, 0, 2, 2, 0, 5 with an address list of

R3, R5, R6, R7, R8, R9

This actual addressing is interpreted as shown in FIG. 4 at Table 400. The addresses of the routers (i.e. the address list in the packet) are listed in column 402, and the entries are enumerated in column 404. The entry number corresponding to the parent of each listed router (i.e. the parent list in the packet) is shown in column 406. The address of the parent is shown in column 408. The address of the parent is obtained by taking the entry number of the parent (listed in column 406) and finding the entry in column 404 with that entry number. The entry address in column 402 corresponding to that entry number is then the address of the parent.

As an example, the entry marked 410 is the entry number 4 as shown in column 404, and corresponds to the router with the entry address R7 as shown in column 404. The entry number of the parent of R7 is 2 as shown in column 406. The entry address shown in column 402 for entry 2 in column 404 is R5. Hence, the address of the parent of R7 shown in column 408 is R5.

Depth Encoding

Turning now to FIG. 5, a route table 500 is shown for the depth encoding technique. As shown in FIG. 5, table 500, the nodes are listed in preorder (i.e. each node is listed before its children) and each list entry contains the depth of that node in the tree. Thus using the original example, this would be encoded as 0, 1, 2, 2, 3, 3, 2, 3

With the address list as before being

R1, R2, R3, R5, R6, R7, R8, R9

This depth encoding method is interpreted as shown in FIG. 5. The address of the entry being considered is shown in column 502. The depth of the entry is given in column 504. The entries are enumerated in column 506. As in parent encoding, it is not necessary to encode R1 and R2, so the actual tree is:

1, 1, 2, 2, 1, 2 with an address list of

R3, R5, R6, R7, R8, R9

Forwarding

On receipt of an SGM encapsulated packet, an SGM capable router performs the is following actions.
1. Checks whether it is a delivery point for this multicast group, by examining the multicast destination address in the encapsulated multicast packet, and if so takes a decapsulated copy of the multicast packet, updates the TTL of that packet to be the TTL in the received SGM packet−1, and forwards the packet via normal multicast.

The multicast destination address can be found easily by indexing (length from SGM header) from the header, then using normal IP packet parsing to find the destination address. Alternatives would be to include the multicast address in the SGM header, or to include explicit 'delivery node' information in the encoded tree. Neither of these alternatives is as attractive as simply using normal IP packet parsing of the SGM data packet to find the destination address.
2. Determines the next hop forwarding destination if any, and forward a copy of the entire encapsulated packet to each of those destinations with the following changes Set the destination IP address in the unicast header to the new destination Decrement the TTL in the unicast header Update the offset field of the SGM header Adjust the unicast header checksum accordingly Interpreting the Tree List Interpreting the tree list depends on the choice of tree list format, and indeed, the choice of tree list format depends primarily on which of these is most efficient.

Parent Tree

The children of node n are found by scanning the list looking for the value n. So in the example 0, 0, 2, 2, 0, 5 with an address list of

R3, R5, R6, R7, R8, R9

At the first hop node the offset has the value 0, so we look for that in the list and find entries 1 (corresponding to R3), 2 (corresponding to R5) and 5 (corresponding to R8).

At R3 the offset has the value 1, and since there are no entries with the value 1, we do not forward any further.

At R5 the offset has the value 2, and we find entries 3 (corresponding to node R6) and 4 (corresponding to node R7).

At R6 the offset has the value 3, and there are no entries with value 3.

At R7 the offset has the value 4, and there are no entries with value 4.

At R8 the offset has the value 5, and we find entry 6 (corresponding to node R9).

Note that while the parent tree does not require any particular ordering, we can improve the algorithm slightly by requiring that it be in preorder form. In that case the search for the offset value can start at entry offset+1 instead of having to scan the entire list.

Depth Tree

The depth tree is guaranteed to be in preorder form. Hence, we can find the children of node n by scanning the list starting at n+1 looking for entries with depth exactly one more than the depth of n (dn). Entries with depth>dn+1 are ignored, and the search terminates on finding an entry with depth<dn+1 (or at the end of the list).

So in the example 1, 1, 2, 2, 1, 2 with an address list of

R3, R5, R6, R7, R8, R9

At the first hop node the offset has a value of zero. We assume that the depth of the root is also zero, so we start at the first element and find the first two entries (corresponding to R3 and R5) have a depth of 1. We ignore the next two entries with depth 2 and find entry 5 (corresponding to R8), also with depth 1. We ignore the final entry with depth 2.

At node R3 the offset has value 1, and the depth of entry 1 is 1. So starting at entry 2 we look for entries with depth 2. Entry two has depth 1 so we terminate the search, with no forwarding.

At node R5 the offset has value 2, and the depth of entry 2 is 1. So starting at entry 3 we look for entries with depth 2. We find entries 3 and 4 (corresponding to R6 and R7 respectively), but entry 5 has depth 1 so we terminate the search there.

. . . and so on.

Comparison of Encoding Methods.

In general (but not in the worst case) the depth tree will require fewer elements of the list to be examined, but it requires an additional test to detect early termination. The difference is marginal. The encapsulating node can easily generate either tree encoding for parent encoding or depth encoding, and the distribution tree lengths of the two encoding methods have identical length.

Building the Multicast Tree

Given a set of 'trace' lists such as those in the example above (D1) R3, R2, R1

(D2, D3) R6, R5, R4, R2, R1

(D4) R7, R5, R4, R2, R1

(D5) R8, R2, R1

(D6) R9, R8, R2, R1

A parent tree can be constructed by processing each trace list in turn (in the order in which they arrived—see below) and assigning sequential Ids to each unique router address encountered. The parent of each node can then be entered by taking the ID of the next router in the list. The address of the encapsulating router is not needed, so its ID is entered as zero.

So after processing the first trace we have 2, 0

With an address list of

R3, R2.

After the second trace we have 2, 0, 4, 5, 2

With an address list of

R3, R2, R6, R5, R4,

And after all traces have been processed 2, 0, 4, 5, 2, 4, 2, 7

With an address list of

R3, R2, R6, R5, R4, R7, R8, R9

Note that this is NOT in pre-order form.

Because trace packets may be processed sequentially, a new receiver can be accommodated merely by 'adding' its trace packet to the existing tree.

To permit correct identification of non-branching and dead nodes (see below) it is necessary to record which nodes are terminators i.e. R3, R6, R7, R8 & R9 in the example. In particular for R8 it is necessary to identify it as a terminator router delivering packets to D5 to prevent router R8 from being removed as a non-branching node, and hence failing to deliver packets to D5.

Changing Routes

The algorithm above will always build a tree incorporating the most recent route from the root to any particular node, overriding any previous routes. This seems to be reasonable behavior given that the most recently received trace packet probably reflects the most recent routing information.

However, the most recently arrived trace packet may not reflect the most recent, and hence "best" routing information since the trace packets could arrive out of order, and the routing may have changed subsequent to the arrival of the last trace packet.

When routes change, it is likely that some portion of the tree will no longer reach any destination. Such 'dead' portions must be pruned off to avoid unnecessary bandwidth wastage. There are two obvious ways to deal with this.

1. Detect that the parent of a node was already set and is being changed to a new value, then follow up the chain of old parents until a node is reached with more than one child (found by scanning the list looking for nodes with parents pointing to this node).
2. Alternatively, the dead branches can be left in place, then pruned by performing a depth first exploration for the entire tree from the root. The exploration looks for nodes that do not lead to a delivery point.

Loops

Partially looping trace packets (as a result of dynamic routing changes) will be dealt with naturally by the above algorithm. When the trace packet crosses its own path the loop will be removed from the tree just as if it had been a new route.

Clearly, persistently looping trace packets will not arrive at their destination and will be treated as dropped trace packets. It is possible that such a packet may overflow the trace list before the hop count is exhausted. When there is no room in a trace packet to add an SGM entry, the packet should be discarded.

Removing Non-Branching Nodes

The tree built by the above algorithm may include non-branching nodes (such as R4 in the example). These can be removed by performing a depth first exploration of the tree from the root and removing nodes that have exactly one child (a node which is also a terminator is never removed). Note that node removal must be done after any dead branches have been pruned, since removal of dead branches may generate further single child nodes.

It is possible to perform the dead branch removal and non-branching node removal during the same exploration. However, this may not be desirable since a new trace packet can be added to the tree after dead branch removal, but NOT after non-branching node removal (since the new path may merge with the old at a node that was previously non-branching). Performing dead branch removal after each (set of) trace packet(s) may be desirable since it allows the memory used to store the dead nodes to be recovered.

Building the Packet Headers

Packet headers in preorder form (either parent or depth) are easily built from the complete parent tree by performing a depth first exploration and reassigning node IDs. Note that for these purposes the trees are built with the first hop router(s) as the root. If there are multiple first hop routers (i.e. the encapsulating router is a branch point), there will be multiple distinct trees.

Removing a Destination

Figure 6:
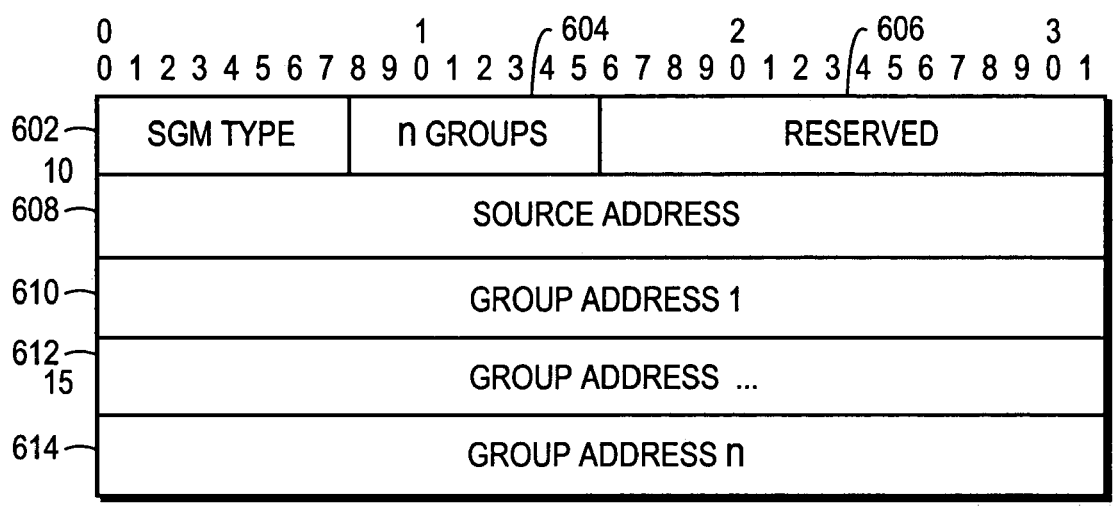
FIG. 6 is a field diagram of a prune message.

Turning now to FIG. 6, fields of a pruning message 600 are shown. Field 602 contains the SGM type. Field 604 contains the number of group address carried in the packet. Field 606 is reserved, i.e. Not used. Field 608 contains the source address. Field 610 contains the first group address. Field 612 contains the second group address, etc. Field 614 contains the n'th group address.

When a destination router detects that it has no more members of the group, it unicasts a 'prune-leave' message directly to the current source SGM router (the current_source_SGM_router) and sets current_source_SGM_router to NO_MEMBERS.

The value NO_MEMBERS is returned when there is no record for the group at the destination router, that is the members serviced by that destination router have gone away. That is, there is no need to retain 'negative' state for the group after its members have gone away.

In an alternative embodiment of the invention, a bit is used to distinguish between prune-leave, and prune-change flavours. A prune-change causes the additional action of inhibiting all downstream heartbeats for the source until a new trace has been received for that source.

The prune message is carried in an IP packet with protocol type SGM, and has the following data format.

SGM Type 602 (1 byte)—Type of SGM packet=2 (prune-leave) or 3 (prune-change)

n Groups 604 (1 byte)—Number of Group Addresses

Source Address 608—Multicast source IP Address

Group Addresses 610, 612, 614, etc. . . . (4*n Groups bytes)—List of Group Addresses to be pruned.

The only information required in the prune message is the source group pair state, [S, G] state, and the address of the destination router. The latter is obtained from the Source IP address of the IP packet. The encapsulating router can then mark the destination router as no longer being a terminator, and remove the dead branch by either of the techniques outlined above. Note that it is NOT necessary to have access to the original trace packet in order to remove it.

Prunes, in an exemplary embodiment of the invention, are not acknowledged. If the prune message is lost, unwanted multicast data may still arrive at a destination router. The value of NO_MEMBERS in the current_source_SGM_router is deemed to match no source SGM router address, and hence leads to re-transmission of prune-leave messages, although at a rate which is limited.

Timer Based Destination Removal

A destination router may die without being able to send a prune-leave message, or it may become partitioned from the rest of the network. In these circumstances, we want the destination router to be eventually removed from the delivery tree. Removal of the destination router from the delivery tree is achieved by the source SGM router maintaining a timer (n*t1) with each destination, and this timing interval, in an exemplary embodiment of the invention, is chosen to be on the order of a few minutes. This timer in the source SGM router is reset by the arrival of a trace packet from that destination router. On expiry of the timer, the destination router is removed as if a prune-leave message had been received.

Destination routers maintain a timer with the value "t1", and send a trace packet when it expires. In an alternative embodiment of the invention, the timers in the various destination routers are jittered in order to prevent them to come into synchronization.

The holding time may be carried in a unicast trace with no difficulty. However, in an alternative embodiment of the invention, multicast trace packets may be used (mtrace) and it could be awkward to maintain an identification between a timer interval and the destination router which requested it. There are enough fields defined in the trace packet to carry timer information, however, the trace packet is no longer of identical form for each destination router, that is, it is not a universal trace packet. In an alternative embodiment of the invention, the source SGM router determines the value of the timer interval, and passes it in the trace-ACK to each destination router.

Memory Scaling Issues in the Encapsulating Router

As a minimum the encapsulating router needs to store

The set of all the unique SGM router addresses mentioned in trace packets it receives. Addresses of nodes pruned because they are on dead branches may be safely forgotten, but addresses of non-branching nodes must be retained in case they are subsequently needed.

For each group (identified by [S, G]), a node list of length N, (where N is the number of unique addresses in the set of trace lists for that group), consisting of offsets into the address list.

In an alternative embodiment of the invention which scales to more than 65 k SGM capable routers for an encapsulating router, then a choice between keeping the 32 bit addresses and accessing them globally through unique offsets is resolved in favor of keeping the 32 bit addresses.

For each group, a parent list of length N.

Note that there is no need to keep the trace lists themselves. An alternative strategy would be to keep just the sets of trace lists for each group, and rebuild the trees from scratch on each change to the set. This strategy may require more storage.

Detecting and Recovering from Failures

Unicast Routing Topology Changes

SGM encapsulated packets are unicast between branch point SGM routers. Changes in unicast topology between SGM routers that do not affect reachability will simply be accommodated by normal unicast routing. SGM encapsulated packets will still be delivered to the next SGM router.

Where the topology changes such that the existing delivery tree is no longer optimum (but is still connected), the old sub-optimal delivery tree will continue to be used until such time as it is re-evaluated as the result of receiving new trace packets. This may occur as a result of new receivers joining the group on destination routers that were not previously receiving the group, or as a result of delivery failure. Hence, the maximum time for which a non-optimal delivery topology will persist is t1, and it will usually be much less, especially in the part of the tree near the root, where multiple traces contribute towards the topology discovery.

Figure 7:
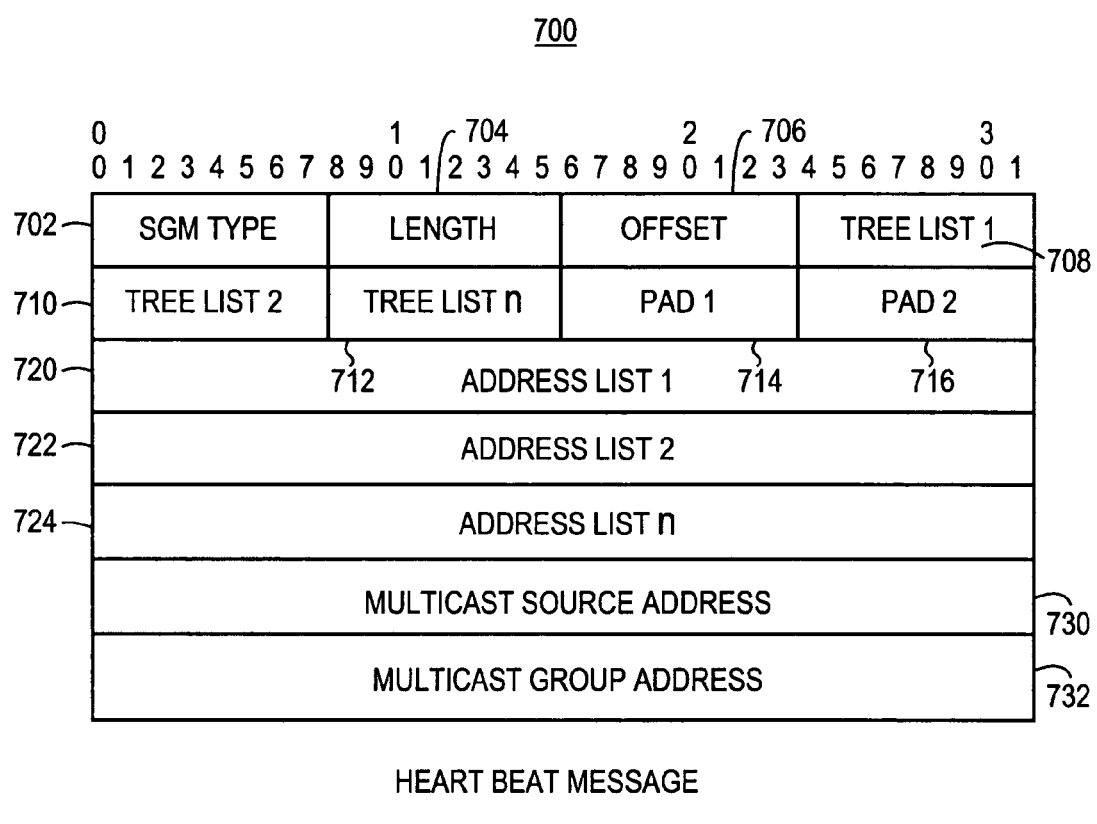
FIG. 7 is a field diagram of a SGM heartbeat packet.

Turning now to FIG. 7, the fields of heartbeat message 700 are shown. Field 702 contains the SGM type. Field 704 contains the length. Field 706 contains the offset. Field 708 contains the first tree list. Field 710 contains the second tree list. Additional tree lists are contained in fields which are not shown. Field 712, etc. contain the n'th tree list. Field 714, field 716, etc. contain padding to make the following addresses lists come out on four byte boundaries. Field 720 contains the first address list. Field 722 contains the second address list. Field 724 contains the n'th address list, etc. Field 730 contains the multicast source address. Field 732 contains the multicast group address.

Failure of an intermediate SGM router on the delivery tree will cause all destinations below it to stop receiving data. Each destination router runs a timer, "n*t2", where t2 is the expected maximum interval between data packets, and n is the number of lost packets which can be tolerated before recovery is initiated. In an exemplary embodiment of the invention, the value of the time interval for the "n*t2" timer may be set by the application, and the value of t2 carried in the trace packets. The timer "n*t2" is reset by the receipt of data for the corresponding [S, G]. On expiry of the timer, a new trace packet is sent towards the source, which will discover a new delivery path (should one exist). Since trace packet delivery is unreliable it is necessary to allow multiple trace packet attempts to be made until a trace-ACK is received. However it may be that the source really is unreachable, and no acknowledgement will ever be received. It would be wasteful to continue trace attempts under those circumstances.

A counter C is maintained per [S, G] and is incremented on each transmission of a trace packet by a destination router containing G towards. S. Receipt of a trace-ACK referring to [S, G] resets the counter in the destination router. If the counter exceeds some limit L, no further trace attempts are made for [S, G] until the process is re-initiated by the application and somehow that fact is reported to the application.

It is envisaged that t2 would be of the order of a second (perhaps less) to allow recovery of a voice over IP connection within a few seconds. However, sending trace packets at this frequency would be expensive. Therefore, in the absence of any real data for [S, G] for a period t2, the encapsulating router sends a dummy 'heart-beat' SGM encapsulated packet carrying no data packet. These have SGM type 130 placed in field 702, with a standard SGM tree header followed by [S, G], as shown in FIG. 7. Receipt of such a packet by the destination router causes the timer to be reset in the same way as a normal data packet and hence inhibits the recovery attempt, but no output multicast packet is generated.

If, in an alternative embodiment of the invention, it were required to operate with tight constraints on the recovery time (of the order of a few seconds), this operation could result in 'heart-beat' traffic being sent every second or so during periods of silence. For extended periods of silence, this much heart-beat traffic amounts to a serious waste of resources, so it is desirable to introduce a back-off mechanism controlled by the encapsulating router. If the SGM header includes the value of t2, the encapsulating router can put progressively longer values in the 'heart-beat' packets after a period of silence, and hence progressively decrease their frequency. The downside of this would be that there could be a large delay in recovery for the first data packets sent after a prolonged period of silence.

Router Reachability Failures

SGM router reachability failures are indistinguishable from router failures, and are dealt with by the same mechanism.

Destination SGM Router Failure Modes

Router Failures

Failure of the destination router causes state for the [S, G] to be lost. If there is only one SGM router to which the multicast receiver can join, then recovery is impossible (until the router in question is re-booted). The branch of the tree leading to the unreachable destination will eventually be pruned by the expiry of the destination holding timer as described hereinabove.

If there are multiple possible destination routers, then normal multicast operation will result in another router receiving the IGMP joins, and beginning the trace registration process in its own right. However the source SGM router will treat this trace registration as a completely distinct delivery point, and will continue to attempt delivery to the old destination router until its holding timer expires as above. This delivery attempt will result in a period of unnecessary packet transmission, but this will usually be restricted to the last hop.

Router Reachability Failures

Router reachability failures are dealt with as for intermediate SGM router reachability failures as described above. If another route exists, recovery will be complete. If not, the destination will eventually be pruned by the expiration of the destination holding timer as described above.

Source SGM Router Failures

If the source SGM router fails, then all the tree state is lost. Normal recovery mechanisms will result in destination nodes re-sending trace packets towards the source. If another route, that is another encapsulating router, to the source station S 102 exists, this recovery may result in the new router becoming the encapsulating router and building a new tree as usual.

If the source SGM router doesn't fail, but is partitioned from the rest of the network, a new source SGM router may be initiated while the old source SGM router eventually (n*t1) prunes off its delivery tree as a result of the failure of periodic destination refresh.

Figure 8:
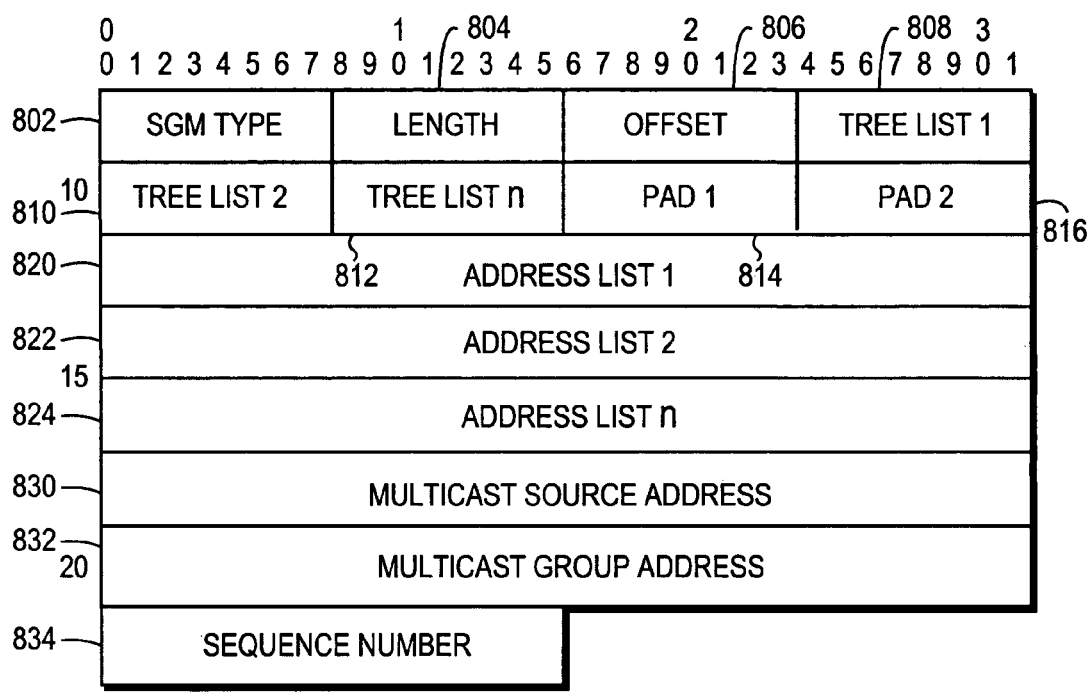
FIG. 8 is a field diagram of a trace acknowledgement packet (trace ACK packet).

Turning now to FIG. 8, fields of an acknowledgement message 800 transmitted by a source end station in response to receiving a trace message from a hopeful destination end station are shown. Field 802 contains the SGM type. Field 804 contains the length. Field 806 contains the offset. Field 808 contains the first tree list. Field 810 contains the second tree list, . . . etc. Field 812 contains the n'th tree list. Field 814 and field 816 contain padding to make the address lists come out on four byte boundaries. Field 820 contains the first address list. Field 822 contains the second address list, . . . etc. Field 824 contains the n'th address list. Field 830 contains the multicast source address. Field 832 contains the multicast group address. Field 834 contains the sequence number.

Route Discovery

The information for building the delivery tree is obtained from trace packets sent from the destination nodes towards the source of the group. The exact form of the trace packet mechanism is described herein.

In the first case we will assume that the source SGM router is the (single) router adjacent to the source. That is, the SGM router knows that it is the encapsulating source SGM router by its proximity to the source. Later we will discuss how to extend this to permit the source to be separated from the encapsulating router(s) by a multicast cloud.

Trace Packets

A trace packet is sent from a destination when the first member of a group joins, and periodically as described above. There are two possible mechanisms, using unicast trace packets, which is described below, or alternatively using multicast trace (mtrace) which is also described below.

In either the unicast trace or the mtrace, the trace packet builds a list of SGM capable routers traversed in order to reach the source SGM router.

Unique IP Address

There needs to be a guarantee that an IP address which goes in the list is unique. Having a SGM router identified by more than one IP address can cause problems with the distribution tree. A router, for example, may have more than one IP address, for example, a different IP address for different ports. Each SGM router must be identified in the list with a unique (single) IP address.

Acknowledgement of Trace Packets

The source SGM router acknowledges receipt of a trace packet, by sending an SGM encapsulated packet to a sub-tree of the optimized multicast delivery tree, which contains only the relevant destination router. No additional optimization is performed on the tree, which may therefore contain multiple hops. Thus the acknowledgement packet is delivered over the same path which will be used for the delivery of multicast traffic and 'shares fate' with that traffic.

Note that the acknowledgement of the first trace packet for the group will be delivered directly to the destination router, since the multicast tree will consist entirely of that one hop. As more destination routers are added, the tree will approach the final multicast delivery tree.

The SGM type 802 is 129 (trace-ACK—the high order bit indicating that it contains an SGM route and should be forwarded using standard SGM forwarding) and the 'encapsulated data' consists only of [S, G] and the two byte sequence number of the trace packet being ACKed.

In an alternative embodiment of the invention, the heartbeat packet could be used instead of the trace-ACK packet. However, using the heartbeat packet is not as desirable as using a specific trace-ACK packet. For example, we need explicit acknowledgement that the trace from a particular destination router has successfully reached the source SGM router. It is NOT sufficient just to know that data is flowing, we need to know that we have found the current 'best' path for this destination. Therefore the trace-ACK must be specific to a particular trace packet. As another alternative, we could SGM multicast (rather than SGM unicast) the trace-ACK packet, but the other recipients can gain nothing from receiving the packet other than confirmation of a working delivery path. That is, the multicast trace-ACK packet could be used instead of the heartbeat—sending a trace-ACK would reset the t2 timer. This multicast of the trace-ACK might actually be slightly preferable, since it would avoid the additional cost on the source SGM router of computing the SGM unicast paths, and the unnecessary delivery is almost free because it replaces the heartbeat. That of course is not true if there is some genuine multicast data. Note also that we would have to include the address of the destination whose sequence number we were ACKing as part of the 'encapsulated data', which would detract from using a multicast trace-ACK.

On triggering a trace packet for a group, the destination router sets the value of current_source_SGM_router for that group to zero. The trace packet is re-sent every TRACE_REPEAT_INTERVAL seconds, incrementing the sequence number on each transmission until a trace ACK with the current sequence number is received. The IP address of the source SGM router for that multicast source (from the IP source address of the trace ACK packet) is then recorded in current_source_SGM_router. This is used to detect changes in the Source SGM router.

The TRACE_REPEAT_INTERVAL in seconds may be set equal to n*t2. The TRACE_REPEAT_INTERVAL needs to be guaranteed to be greater than the normal round trip time for trace/trace-ACK packets between the destination and the source. Also a window on the acceptable sequence number range is an aid in distinguishing a trace packet and its trace-ACK packet.

Becoming the Source SGM Router

When an SGM router determines that it is the source SGM router, it performs the actions associated with a member of that group sending an IGMP register. That is, the router does a PIM join, or whatever action is appropriate, to pull down, that is to receive, the multicast traffic for that [S, G].

PIM is a standard multicast protocol (as described in RFC 2362) called "Protocol Independent Multicast". Other non SGM domain multicast protocols from which a SGM router can receive multicast packets comprise Distance Vector Multicast Routing Protocol (DVMRP) RFC 1075, Multicast Extension to OSPF (MOSPF) RFC 1584, Core Based Tree (CBT) RFC 2189, etc.

For example, under PIM protocol, a PIM router sends a JOIN packet towards the source (or towards a Rendezvous Point under the PIM protocol). The point is that a source SGM router must do whatever is necessary, under the multicast protocol being used for a desired multicast group, to cause it to receive traffic for the multicast group. In this example, the SGM router sends a PIM JOIN message. However, if the non-SGM domain were running a different multicast protocol, then the SGM router must do whatever is appropriate for that multicast protocol in order to receive traffic from that multicast protocol.

Ceasing to be the Source SGM Router

When the last destination for [S, G] is removed from a source SGM router (either as a result of receiving an SGM prune, or as a result of the destination holding timer expiring), the router performs the appropriate multicast leave operations and purges all state for [S, G].

Figure 9:
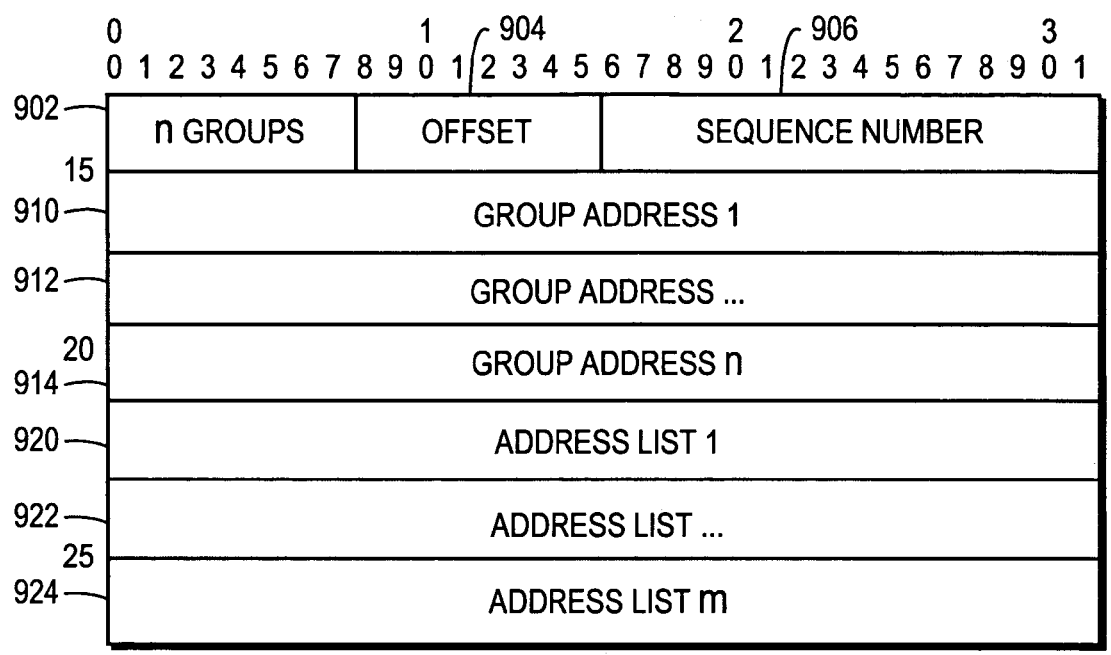
FIG. 9 is field diagram of a unicast trace packet.

Turning now to FIG. 9, fields of unicast trace message 900 are shown. Field 902 contains the number of group addresses. Field 904 contains the offset. Field 906 contains a sequence number. Field 910 the first group address. Field 912 contains the second group address, etc. Field 914 contains the n'th group address. Field 920 contains the first address list. Field 922 contains the second address list, etc. Field 924 contains the n'th address list.

Unicast Trace

A unicast packet containing the router alert option (RA option) is addressed to the source address. A router alert option is an IP option defined in RFC 2113. The router alert option, if the flag is SET, tells a router that a packet is "interesting", and to examine the packet more closely by parsing more fields. In the event that the router alert option is not set, the router simply routes in response to the layer 2 and layer 3 fields. A unicast packet having the router alert option SET is forwarded normally by non-SGM capable routers (but it will incur the penalty of RA processing to determine that it is not interesting). SGM capable routers append their IP address to the list, update the offset and re-forward the packet towards the source address.

The Internet Control Message Protocol (ICMP) is used for many messaging tasks in computer communications over computer networks, including the Internet, and is described, for example, by William Stallings in his book *Data and Computer Communications, Fifth Edition*, published by Prentice Hall, Copyright date 1997, all disclosures of which are incorporated herein by reference, especially pages 546-549.

The packets have the following format:
Normal unicast IP header with RA option (router alert option)
Destination address=source address of multicast group
Source Address=Destination router ID
Total Length=IP Header length+(max trace length+1)*4
Protocol=SGM
Data, comprising
If the SGM system is NOT using ICMP traces, additionally a checksum may be needed here.
n Groups 902 (1 byte)=Number of Group Addresses
Offset 904 (1 byte)=Offset (in 4 byte units) of next free position (initialized to zero)
In an alternative embodiment of the invention, the offset byte can be omitted if the trace packet is allowed to grow at each step (rather than reserving space a priori). In that case the next trace element is simply added at the end of the packet, and the length is adjusted accordingly.
Sequence number 906 (2 bytes)
Group Address 910, 912, 914 (n Groups*4 bytes)=List of Group Addresses to which this trace refers
Address List 920, 922, 924 (max trace length*4 bytes)= List of SGM router addresses (initialized to zero)
Locating the Source SGM Router(s)

Up to now, it has been assumed that the source SGM router is adjacent to the source host and can identify itself as such. Details of how an adjacent source is detected are described hereinbelow. The source SGM router:
1. Records the state information from the trace packets, and builds the delivery tree.
2. Sends a trace-ACK to the originator of the trace packet.
3. Encapsulates subsequent multicast data packets for [S, G].
4. Performs whatever actions are necessary to pull down, that is to receive, the multicast traffic for the group.

An SGM router that is NOT the source SGM router retains no state from the trace packets it forwards. This requirement allows intermediate routers to handle millions of SGM sessions, as the routers retain no state for any of the SGM sessions.

However, this requirement places considerable constraint on the design that all sources must be adjacent to an SGM capable router. In an alternative embodiment of the invention, the source may be separated from the 'first' SGM capable router by a conventional multicast domain (that is be separated by an IP cloud) because:
1. It may not be feasible to deploy SGM capable routers adjacent to every host.
2. It may be required for administrative reasons to use conventional multicast for that portion of the delivery tree between the source end station and the source SGM router.

Figure 10:
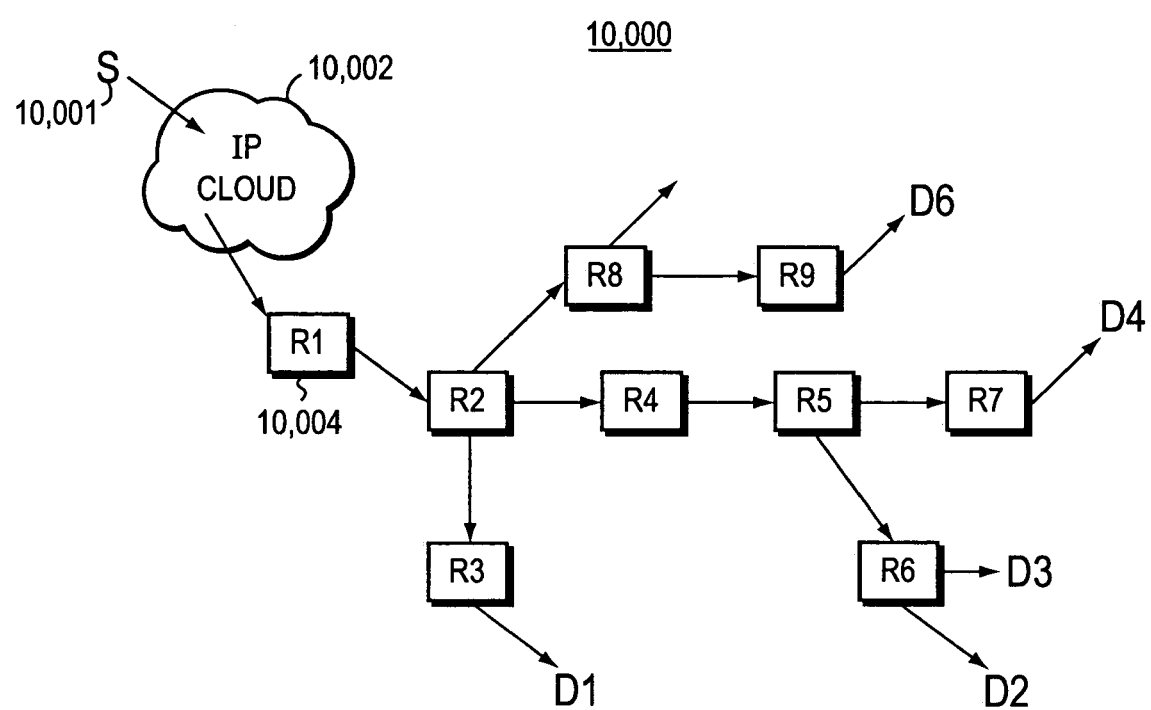
FIG. 10 is a block diagram of a computer network having the SGM source router separated by an IP cloud from the multicast source station.

Turning now to FIG. 10, network 10,000 is shown with IP cloud 10,002 between source end station S 10,001 and the distribution tree of routers. Router R1 10,004 is the source SGM router. The remainder of FIG. 10 substantially duplicates FIG. 1, and the discussion under FIG. 1 relating to source router R1 120 applies to router SGM 10,004, since it is the encapsulating router illustrated in FIG. 10.

Remote Source Detection

A small modification to the format of the trace packet allows the source end station S 10,001 to be across an IP cloud from the encapsulating router 10,004. The data portion of the 'trace' packet is carried as the data portion of an ICMP echo request packet with destination address the group source IP address, source address the destination router IP address (initially) and an RA option. The ICMP echo request identifier is set to the protocol type assigned to SGM to provide some protection against aliasing with genuine 'ping' traffic.

An SGM router intercepting the packet updates the trace information with its own unique IP address (including adjusting the offset pointer and the IP header total length field) and also sets the source IP address of the ICMP packet to be its own unique IP address. Both the ICMP and IP header checksums must be modified as appropriate. Any source host receiving the packet acts on it as a normal echo request and returns it to the last SGM router (i.e. the most recent value inserted as the ICMP source IP address) as an echo reply with the trace data intact. On receiving such a packet, the SGM router establishes itself as source SGM router, builds the initial part of the tree from the enclosed trace list, and sends a trace-ACK to the initiator of the trace (i.e. the first address in the trace list).

Note that the ICMP sequence number is distinct from the sequence number contained within the trace, where the sequence number contained in the trace is used to increase the confidence in a trace-ACK. We can't use trace sequence number, because the intermediate SGM routers (which MAY turn out to be the source SGM router) cannot retain knowledge of it.

That is the SGM router could increment a single (irrespective of source or group) 16-bit sequence number every second and insert that as the ICMP sequence number of any SGM trace packets it modifies. By testing this sequence number, the SGM router could then only accept a returned packet that is within a few seconds of the current value.

There's an obscure case that needs discussion. Since the returned echo response packet will, presumably, still have the RA option set, it will be examined by all routers between the source and the source SGM router. It is possible, perhaps as a result of dynamic topology changes, or asymmetric routing, that one or more of these routers may be SGM capable. We then have the strange situation that we have found an SGM router that appears to be 'closer' to the source than the router we had previously identified as the source SGM router. However, this is 'closer' in the source to destination sense. Since multicast routing uses RPF, we prefer the original, which is closer in the destination to source sense. If it turns out that the dynamic routing changes converge such that the second router really is 'closer' in the required direction, then the source SGM router change procedures described herein will ultimately resolve the situation. Hence any echo responses seen by an SGM capable router which are not directly addressed to it can safely be ignored.

Adjacent Source Detection

Changing the Source SGM Router

When the source SGM router is not an immediate neighbor of the multicast source, routing changes may result in a different source SGM router being identified by subsequent trace packets. The new source SGM router will begin to encapsulate data packets down the delivery tree, but the original source SGM router will also continue to encapsulate packets down its delivery tree, until the destination router holding timer expires. Thus multicast data will be duplicated for the period of the destination router holding timer.

It is undesirable to make the period of the destination router holding timer too short, because it is necessary to send 2 or 3 trace packets during this timer period to keep the destination router holding timer refreshed, and trace packets are relatively expensive. The destination router holding timer is only required to allow failing destination routers to be eventually removed from the delivery tree. For this purpose a period of a few minutes is adequate. Periodic trace packets are also required at about this frequency to detect topology changes that would give rise to more optimal delivery paths. Detection and recovery from delivery failure is handled by a different mechanism, triggered by failure to receive data.

In order to minimize the period of duplication, a destination router checks the source address (i.e. the address of the encapsulating source SGM router) of each SGM encapsulated packet received, including heartbeat packets. If it does not match the value of current_source_SGM_router corresponding to the IP source address of the encapsulated multicast packet (or that of the heartbeat packet), it indicates that duplicate data may be being received. The data (if any) is delivered in any case (a short duration of duplication is preferable to the risk of dropping data erroneously), but an SGM prune-change is triggered, to be unicast directly to the unrecognized source SGM router. These prunes are rate limited.

A value of zero in current_source_SGM_router (indicating that the current source SGM router is unknown because a trace is in progress, is deemed to match any source SGM router. No prunes are sent until the correct source SGM router has been identified, by receiving a trace-ACK.

A value of NO_MEMBERS in current_source_SGM_router (indicating that the destination router no longer has members for the group) is deemed to match no source SGM router. Hence, rate limited prune-leaves are sent to the source address of the encapsulated packets in response to SGM encapsulated data for the group from any source SGM router.

Failures in the Multicast Delivery to the Source SGM Router

Since the source SGM router is sending heartbeats towards the destinations to suppress traces even in the absence of multicast data, we will only ever see periodic traces while the delivery path between the source SGM router and the destinations remains intact. This is true even if there is a multicast delivery failure between the source and the source SGM router(s). If the traces from the destinations had not been suppressed, they might have been able to discover a new source SGM router, which had connectivity to the source.

It is not possible to use a heartbeat from the source to the source SGM router(s) to detect failures in the multicast delivery to the source SGM router. To detect this type of failure with heartbeat packets would require co-operation from the source host, and the present system avoids involving the host computer. Similar functionality can be achieved by the use of pings or mtrace as discussed hereinbelow. However, frequent pings from source SGM routers are a considerable overhead. It is instructive to consider whether the gains justify the expense.

Once a source SGM router has joined the conventional multicast delivery tree, it is the conventional multicast protocols which will (attempt to) maintain the delivery path from the source to the source SGM router(s). Failures of intervening routers and links should (if connectivity still exists at all) not affect the reliable delivery of multicast data to the source SGM router(s). If multicast routing fails to deliver multicast data to a particular source SGM router, then it is possible that the SGM router has become partitioned from the conventional multicast network. If this is the only feasible source SGM router, then recovery is impossible. But it may be that some other potential source SGM router still has multicast connectivity.

Each destination router is sending periodic traces at the rate of once per "t1" seconds. In the steady state these will all converge on the source SGM router in question. Thus, there are "m" opportunities per t1 seconds for a periodic trace packet to discover an alternative source SGM router, where "m" is the number of destination routers associated with both the multicast source and the source SGM router in question.

When such a trace packet discovers an alternative source SGM router, the mechanisms described herein will cause a prune-change message to be sent to the original source SGM router. On receipt of such a prune-change message, the source SGM router performs the normal prune-leave action of removing the associated destination router from the delivery tree. In addition; it ceases transmitting downstream heartbeat packets to all destination routers associated with the source. Sending of heartbeat packets is not resumed until a period of (N+1)*t2 seconds has elapsed and a new trace packet for the source has been received. In the absence of genuine multicast traffic, this will cause the remaining destination routers served by this source SGM router to begin non-periodic tracing, and hence rapidly discover the new source SGM router if appropriate. If, on the other hand, multicast data is still arriving at the source SGM router, then this confirms that the conventional multicast delivery tree is still intact, and there is no harm in the non-periodic trace messages continuing to be suppressed.

The effect of these mechanisms is that such a failure in the multicast delivery to the source SGM router will be repaired for the first destination in an average time of about "t1/m" seconds, and the remaining destinations should catch up in a further period of n*t2 seconds.

In an exemplary embodiment of the invention where t1=60 seconds, t2=1 second, n=3 and m=3, we could hope for complete recovery (if at all possible) in around 23 seconds. Clearly this time is very dependant upon m. In a further exemplary embodiment of the invention, t1 is adjusted with m to give a constant average interval between expected arrival of traces for a particular source at a particular source SGM router. This adjustment of t1 and m could easily be achieved by returning the value of m in the trace-ACK packets. This adjustment also has the (small) advantage that the trace load scales nicely with increased group size. Note that scaling of the trace load with increased group size assumes that the packets are well distributed, while experience shows the converse to be more likely. Therefore, in a further exemplary embodiment of the invention, it may be worth attempting to dynamically-adjust the suggested t1 intervals to achieve an approximately even distribution in arrival times of trace packets. This dynamic adjustment, may however, create processing overheads which might rule out such dynamic adjustment.

Summary of Timers

The previous sections have identified a number of timers. Their use is summarized here for clarity.

Periodic timer t1: This timer is used for periodic functions to discover more optimal topology. Destination routers send periodic trace packets every t1 seconds, and failure to receive such a packet from a destination router for a period of n*1 results in the state for the destination being pruned. A plausible value for t1 is 60 seconds.

Error recovery timer t2: This timer is used for protocol functions associated with the recovery from errors such as failed routers and links. The source SGM router guarantees to send SGM encapsulated data (genuine multicast traffic, heartbeats, or track-ACKs) at least once per t2 interval. Failure to receive such data for a period of n*t2 results in the destination router initiating a trace. In the absence of a trace-ACK, such traces are repeated up to TRACE_FAILURE_COUNT times at an interval of TRACE_REPEAT_INTERVAL. Once the count has been exceeded, the destination router abandons further attempt to join that [S, G] (until when?).

Service interruption as a result of router or link failure will be at least n*t2 seconds, rising in increments of TRACE_RE-PEAT_INTERVAL seconds if trace packets are lost. A plausible value for t2 is 1 second.

Trace Repeat Interval: The interval between non-periodic trace attempts. In an exemplary embodiment of the invention this timing interval is assigned the value of "n*t2".

Multicast Capable Subnetworks

Figure 11:
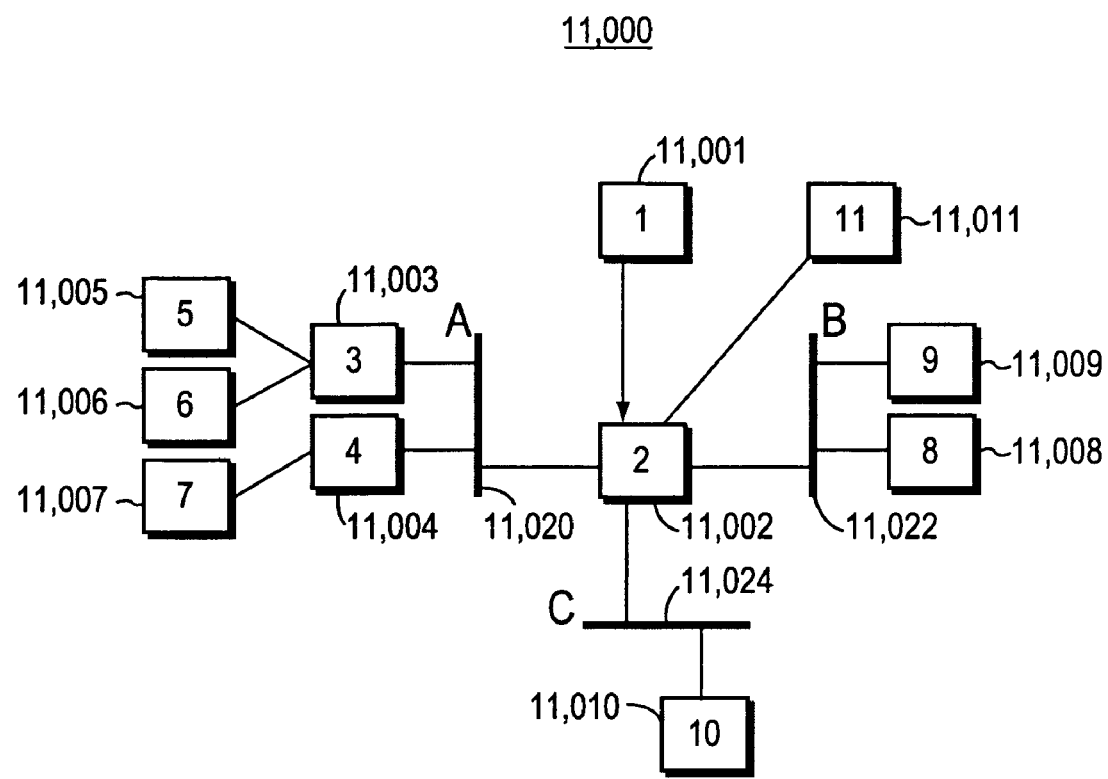
FIG. 11 is a block diagram of a multicast group in a computer network, with pseudo-nodes.

Turning now to FIG. 11, computer network 11,000 is shown with multicast capable subnetworks and also using pseudo nodes. Routers are indicated as follows: router 1 11,001, router 2 11,002, router 3 11,003, router 4 11,004, router 5 11,005, router 6 11,006, router 7 11,007, router 8 11,008, router 9 11,009, router 10 11,010, router 11 11,011, pseudo interface A 11020, pseudo interface B 11022, and pseudo interface C 11024.

The algorithms described so far will not take advantage of a subnetwork that has layer 2 multicast capability. A separate copy of the data packet will be unicast to each child router on the subnet. This compares poorly with true (legacy) IP multicast which will (usually) multicast a single copy of each data packet to all the downstream routers on the subnet. The following sections describe enhancements to permit a similar optimization for SGM.

Modified Trace Packets

When transmitting a trace packet, the source IP address of the enclosing ICMP packet is set, not to the SGM loopback address, but to the actual transmitting interface IP address. The SGM loopback address is still inserted in the trace list as before. Note that this causes the trace reply (ICMP reply) to be returned to the interface address of the source SGM router, and not its SGM loopback address.

When receiving a trace packet over a layer 2 multicast capable LAN (only), a check is made to determine whether the source IP address of the enclosing ICMP packet is a direct neighbor over that interface. If so an additional pseudonode identifier is inserted into the trace list before also inserting the SGM loopback address as normal. The pseudonode identifier is assigned uniquely to the interface within the scope of that router, and has the top 3 bits (i.e. class D) set to allow it to be distinguished from a genuine node identifier (since a class D address will never be used as the SGM loopback address).

A pseudonode indicates that a node is special, in that it has a multicast capable LAN. The multicast LAN must be identified, as a router may have multiple multicast LANs connected to its many ports. It is necessary to identify the downstream children which may be reached over which LAN. The pseudonode is used to identify those children which have a common parent LAN. However, the real parent is the router itself. The pseudonode is used to stand, as a router, as the parent of the downstream tree structures. The pseudonode does not appear in the final delivery tree, but the pseudonode is necessary in order to build the correct tree.

An alternative would be to have a bitmap at the start of the trace packet, and set the corresponding bit to indicate that the address in question was a pseudonode identifier. Using a bitmap would allow the real interface address to be used as the identifier.

The additional cost of using a pseudonode identifier is four (4) bytes per multicast capable subnetwork traversed by the trace packet. In the worst case this cost could double the number of entries. However a 1500 byte trace packet is capable of containing around 370 IP addresses which are shared between trace list entries and group membership identifiers.

In an alternative embodiment of the invention, the number of groups per trace packet is limited to ensure that the trace list can grow to maximum length. That is, reserve 255*4=1020 bytes for a maximum length (maximum hop count and every router an SGM router). That limitation would allow around 114 groups in a 1500 byte trace packet. If there are more groups than that, the groups can be split between multiple trace packets. However, splitting the groups between multiple trace packets does not work for the worst case with pseudonodes (or for that matter for Maximum Transmission Units (MTUs) less than 1024, even without pseudonodes). A MTU is the largest packet size which can be transmitted between source and destination without fragmentation.

Admittedly, the worst case, 255 hops all of which are SGM capable with multicast capable subnets, is somewhat unlikely. We could probe with a single multicast group, and get the trace ACK to return the actual hops and hence allow subsequent traces to fill up the available space. However, that using multiple traces does not allow for topology changes dramatically increasing the hop count.

Modified Tree Building Algorithm

When processing the trace packet the pseudonode identifier is removed (i.e. it never appears in the tree address list placed in the SGM data packet header.) However its presence is noted. If the set of logical children of a particular pseudonode (i.e. the children of the parent of the pseudonode whose traces include the pseudonode) has two or more members, those children are retained even if they themselves have only one child. Retaining the children ensures that the routers that receive the multicast SGM data packet will always appear in the address list even if they are not a branch point. This is necessary to enable them to identify their position in the delivery tree, since the multicast packet is of necessity the same for all recipients.

In addition, in an exemplary embodiment of the invention, each pseudonode of a particular router is given a unique identifier in the range 1-15. This assignment may or may not correspond to the original interface number, which may or may not be encoded in the pseudonode identifier carried in the trace packet. However, a router may well have more than 15 interfaces, and this assignment of a unique identifier restricts it to not have more than 15 interfaces over which any one data packet requires to be multicast. This identifier is encoded in the top 4 bits of the tree list entry for each child (the bottom 4 bits being the offset of the parent).

In order to maximize the size of distribution tree which can be accommodated within the 4 bit parent offset restriction, we can observe that no leaf node (i.e. one with no children, whether or not it is a delivery point), by definition, is ever referenced as a parent. By arranging that all leaf nodes appear at the end of the trace list (this can be done without breaking the pre-ordering requirement), we can ensure that all of the 15 available parent offset identifications are assigned to nodes which are referenced as parents. In a further alternative embodiment of the invention, this limitation of the number of interfaces to 15 can be raised by using more bits in the identifier.

An example follows.

We would expect the following trace packets towards router 1 in the exemplary network shown in FIG. 11. The routers and pseudo interfaces are referred to by their number and letter designations.

5,3,A,2,1

6,3,A,2,1

7,4,A,2,1

10,C,2,1

8,B,2,1

9,B,2,1

11,2,1

We keep 4, even though it is not a branch point, because A has multiple children (3 and 4).

The resulting trace list is (using hex to make the top and bottom 4 bits clearer)

00,01,12,12,03,03,04,22,22,02,02 with an address list of r1,r2,r3,r4,r5,r6,r7,r8,r9,r10,r11

Modified Forwarding Algorithm

When searching for children, only the bottom 4 bits of the trace list entry are compared to the parents index. Thus in the above example, R2 will treat R3, R4, R8, R9, R10 and R11 all as its children. However, it performs the following additional tests on the set of children.

1. If the top 4 bits are zero, a copy is unicast to the child as normal. Thus R10 and R11 receive unicast copies.
2. If the top 4 bits are non-zero, it performs a next hop lookup on the corresponding IP address, to determine the output interface, and multicasts, to all-SGM routers, a copy over that interface. It then marks all subsequent entries in the children set as having been processed. Thus R3 has an entry of 12, hence it looks up R3, determines that interface A is the output interface, multicasts a copy over that interface and sets the remaining entries for 12 (R4) as processed. The next child of R2 is then R8, and the process is repeated over interface B.

On receipt of a multicast copy, an SGM router needs to find its own position in the address list. This could be achieved by always scanning the address list looking for one's own address, but that involves n 4 byte compares. The number of compares can be restricted by the following algorithm. Note that when sending the multicast copy, the pointer is always adjusted for the first of the children.

If the entry corresponding to the pointer has the top 4 bits zero no address check is required and the algorithm works as before. If the top 4 bits are non zero, the address corresponding to the pointer is checked against the receiving router's own address. If it matches, the current location is correct and forwarding can proceed as normal. If not, it searches along the tree list (starting from the current location) looking for the same value (including the top 4 bits) as the current entry. If it finds it, it again checks the corresponding address, and if it matches, the search terminates and the packet is forwarded as normal, otherwise the search continues. If the search fails to find an entry the packet is discarded, since this must have been a multicast packet received by virtue of a router which is not a member of the tree being on the same LAN as members of the tree.

To proceed with the example, when R3 receives the multicast copy it finds the pointer at 3, and the top 4 bits of the entry have the value 1. It therefore checks its own address against 3, finds a match and forwards normally. When R4 receives the packet, it performs the same checks, but this time the address doesn't match, so it searches for the next entry (4) with the value 12. The address check of 4 now succeeds and forwarding proceeds normally. If there were another router (R12 say) on LAN A, which was not part of the delivery tree, it too would receive the multicast packet, but both checks would fail, and so it would be discarded. The number of checks which a router must perform can become large, for example, in a LAN with n downstream members of the tree, not only do each of those routers have to perform up to n checks (overall a total of n(n+1)/2 checks per packet), but every router on the LAN which is not a member of the tree must also perform n (failing) checks.

Further Optimisations

Further optimizations may be possible, taking advantage of the fact that there may be multiple groups that share the same source or source SGM router(s). On balance, they may not be worth the extra complexity they introduce, but they are discussed below for completeness.

Multiple Groups with the Same Source

A destination router may have multiple active groups that share the same multicast source (and implicitly, the same source SGM router). In this case a single trace MAY be sent for the entire set of groups, containing a list of the group addresses to which it refers. However, with mtrace traces there is no space in the trace packet for a list of groups, since the group is encoded in the single mtrace 'Group Address' field.

Not only does sending a list of groups in one trace packet reduce the bandwidth requirements for trace packets, but it may also reduce the memory requirements in the source and destination SGM router(s). In this case of a list of groups in one trace packet the destination SGM router need maintain current_source_SGM_router only per source, and not per [S, G].

However, separate trace-ACKs will still be required, since the SGM delivery trees for the groups may be different, owing to their different membership. For similar reasons, it is not possible to use traffic or SGM heartbeats arriving at a destination router for one group to imply correct operation of any other group even though they share the same source and source SGM router.

Minimising the Source Impact of Trace Packets

The algorithms described above require the multicast source to process at least one trace packet per periodic time "t1" for every distinct destination router served by all groups to which it is transmitting. Under normal conditions the traces will all converge at one (or more) source SGM router(s). The portion of the trace from the source SGM router to the multicast source and back is only necessary to detect the arrival of a new SGM capable router closer to the source (once the initial detection of the source SGM router has been accomplished). Limiting the number of such packets can therefore reduce the load on the multicast source.

When a router sees a trace packet travelling to the source S, and it already has encapsulation state for [S, *] (i.e. it is a source SGM router for [S, *]) it can 'short circuit' the delivery of such trace packets provided at least one such packet per "t1" interval is allowed to pass unimpeded. Such short-circuited packets must be processed as if they had been received as responses from the source. This reduces the load on the multicast source to one trace packet per t1 interval, but still maintains the possibility of discovery of a closer source SGM router within that interval.

Note that this optimization does not necessarily conflict with the mechanisms described for recovering from failures which require the detection of a new source SGM router. Only those trace packets that actually pass through the current source SGM router, are affected. Where the path from the destination router to the potential source SGM router does not pass through the existing source SGM router there will still be m opportunities per t1 seconds.

Multiple Groups with the Same Source SGM Router, but Different Sources

Since the sources are different, it is necessary to use separate traces, as they may subsequently identify different source SGM routers for the groups. The same arguments as above preclude the use of common trace-ACKs or heartbeats unless the delivery trees of the groups are identical.

Minimal Encapsulation

Figure 12:
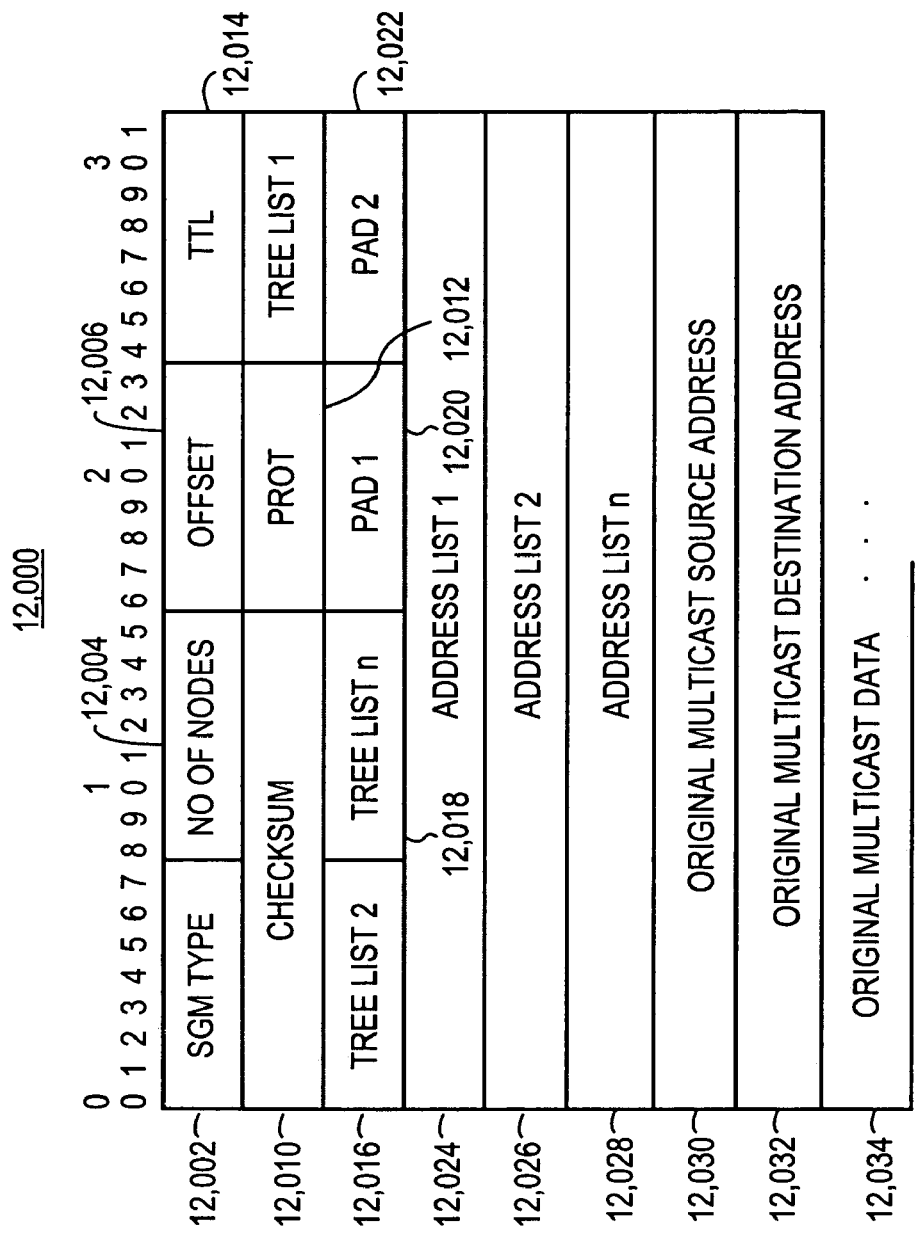
FIG. 12 is field diagram of a multicast data packet with reduced redundancy.

Turning now to FIG. 12, an alternative encapsulation of multicast data referred to as a minimal encapsulation multicast packet 12,000 is shown. Field 12,002 contains the SGM Type. Field 12,004 contains the number of nodes in the distribution tree list. Field 12,006 contains the offset. Field 12,008 contains the time to live (TTL) value taken from the normal unicast IP header. Field 12,010 contains a checksum.

Field 12,012 contains the Prot value (that is the contents of the protocol field of the IP header). This field indicates the protocol carried by the original multicast data (for example UDP). This PROT field is needed because in the minimal encapsulation header the Prot field in the outer IP header is replaced with a value indicating SGM.

Field 12,014 Contains the first tree list. Field 12,016 contains the second tree list, etc. Field 12,018 contains the n'th tree list. Field 12,020, 12,022 contain padding. Field 12,024 contains the first address list. Field 12,026 contains the second address list, etc. Field 12,028 contains the n'th address list. Field 12,030 contains the original multicast source address. Field 12,032 contains the original multicast destination address. Field 12,034 is the first field of the original multicast data.

In the existing encoding for an SGM data packet, several fields are duplicated between the original multicast header and the IP header of the SGM data packet. By using similar techniques to RFC 2004 "Minimal Encapsulation within IP", this duplication can be avoided. The modified SGM data packet is as shown in FIG. 12.

The original multicast source and destination addresses from the multicast packet (together with the data of course) are kept intact, but the preceding parts of the original header are stripped out.

The original Prot is stored in the SGM header field 12,012 (the outer IP header Prot, being set to SGM).

ToS, ident, frags and TTL are copied into the outer IP header (and copied back on decapsulation).

The SGM header TTL field 12,008 is still required for multicast capable LANs as described herein.

The SGM checksum field 12,010 covers the original multicast source and destination addresses as well as the other SGM header fields. However if all the SGM header fields were covered it would be necessary to incrementally adjust the checksum when the offset (and TTL) are changed. Therefore, the SGM checksum is defined to start at the checksum field 12,010. Omitting the offset exposes the venerability to corruption of the offset but this can only cause the following errors:

If it is corrupted to an earlier value, the packet may be returned to a previous point in the delivery tree, causing duplication along the branches not leading to the current router.

The branch below the current router will receive a single copy of the packet. No data loss will occur, and a single instance of corruption will only cause a single instance of duplication, since the contents of the offset field will be reset. Unlike corruption of an address list value to an address earlier in the list, which can cause repeated duplication (until TTL runs out) if we rely on searching the address list to find the current router. Use of the offset field protects against repeated duplication.
1. If it is corrupted to a later (but still valid) value, the intervening branches will suffer packet loss (since the packet will appear to 'jump' to the later point in the tree).
2. If it is corrupted to an invalid value, the branch below the current router will suffer packet loss.

Benefits: Deleting the offset saves 11 bytes (or thereabouts, because of alignment issues) compared to the full encapsulation. For example, in what might be a common case of three delivery points from a common fan out (i.e. 3 addresses in the address list), the minimal encapsulation would cost a total of 32 bytes encapsulation overhead, compared to 44 bytes with full encapsulation headers. For a typical uncompressed VoIP packet, which is about 50 bytes, that's a 64% overhead compared to 88%. This should be compared to the 'overhead' of using separate multicast packets, which in the above case would be 200%, since 3 unicast packets would be required.

Costs: This form of encapsulation is less efficient for encapsulation and decapsulation. It also precludes the possibility of using a separate ToS value for the SGM encapsulation, since this must be copied from the original multicast packet.

Problems with Fragmentation.

Fragmentation is an issue with SGM, whatever encapsulation is used, since an SGM packet may be fragmented by intermediate non-SGM routers (i.e. by performing normal IP fragmentation on the outer IP header). Since not all fragments will contain the SGM header, and hence cannot be SGM forwarded, it is necessary for SGM routers (i.e. the destination of the outer IP header) to perform re-assembly before SGM forwarding. The situation is complicated if the "minimal encapsulation" SGM header is used, since there is then only one set of fragmentation information. If the multicast packet were already fragmented before SGM encapsulation, it would invoke re-assembly at each SGM hop. Presumably, since it required fragmentation in the first place, it would then need to be re-fragmented for transmission.

Given that (potential) re-assembly at every SGM router is highly undesirable, the best solution may be to set the "don't fragment" bit in the outer IP header, and hence never do any re-assembly at an SGM router. (This would be desirable even with a full header encapsulation). In the case of 'minimal encapsulation' it would be necessary to find a single bit somewhere in the SGM header to carry the original value of the DF bit. DF and MF are flags in the IP header. When DF is set, it means do not fragment the packet. When the MF flag is set, it means that there are more fragments.

However, if the original multicast packet had previously been fragmented this could result in a packet with DF set AND non-zero values for either or both of MF and fragment offsets. It is not clear whether this would be treated as an error by any IP implementation. If it would, then it would be necessary to store the whole 16 bits of the fragmentation fields in the SGM header, which makes the 'minimal' somewhat less attractive.

Figure 13:
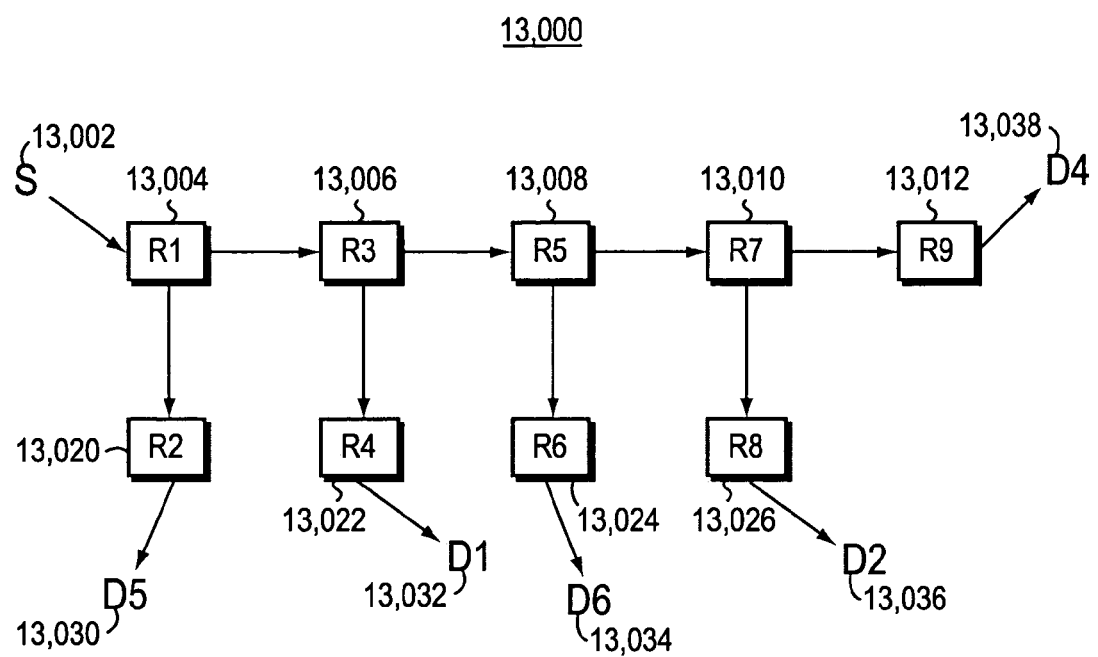
FIG. 13 is a block diagram of a multicast delivery tree with worst case features.

Turning now to FIG. 13, a worst case routing multicast tree 13,000 is shown. Source computer S 13,002 is the source of a multicast transmission. Routers comprise: router R1 13,004; router R3 13,006; router R5 13,008; router R7 13,010; router R9 13,012; router R2 13,020; router R4 13,022; router R6 13,024; router R8 13,026, etc.

Multicast destination computer D1 13,031 receives multicast packets from delivery node router R4 13,022. Multicast destination computer D2 13,036 receives multicast packets from delivery node router R8 13,026. Multicast destination computer D4 13,038 receives multicast packets from delivery node router R9 13,012. Multicast destination computer D5 13,030 receives multicast packets from delivery node router R2 13,020. Multicast destination computer D6 13,034 receives multicast packets from delivery node router R4 13,024.

Small Group Multicast is designed to operate with a 'small' group. However, the to limiting factor is not the size of the group (i.e. number of group members) per se, but rather the size of the encoded delivery tree. The size of the encoded delivery tree depends on the number of destination routers (which may each serve multiple group members) and also on the topology of the delivery tree. An example of a worst case delivery tree is shown in FIG. 13.

N delivery nodes require an encoded tree of length 2N−1. The best case (ignoring the trivial case where the encapsulating router sends a packet directly to each delivery node, requiring a zero length encoded tree) is where each node on the tree is itself a delivery node, which requires an encoded tree of length N. Thus for any set of N delivery nodes, the encoded length may vary between N and 2N−1 depending on the topology. Since the topology may change during the lifetime of the group, the encoded tree length may also change between these limits even if the number of delivery nodes remains constant. Equally, the number of delivery nodes may change as nodes join and leave the group. A number of possible strategies for controlling the size of the encoded tree are discussed below.

Limiting the Number of Members

The absolute worst case is when each delivery node serves a single member as in FIG. 13 where delivery node routers R2, R4, R6, R8, and R9 each serve only one destination computer, or group member. The topology of FIG. 13 is close to requiring worst case encoding. For example, if limiting the number of members to a maximum of 5 group members were permitted, the encoded tree would never exceed 9 addresses. This would be a simple strategy to explain to users, but is severely restrictive. It is also hard to police, since the actual number of group members is unknown to the SGM protocols. However, a protocol using source information supplied by members could possibly police a limitation on the number of members.

Limiting the Number of Destination Routers

Since each destination router is required to perform a trace and receive a trace-ACK when it "joins" the group, it is possible for the source SGM router to check the current number of destination routers, and reject the join attempt (by sending a trace-NACK) for a new destination router. A "hard" worst case limit can be chosen which will guarantee an upper limit on the size of the delivery tree irrespective of any topology changes.

Multiple Source SGM Routers

Where there are multiple source SGM routers, each SGM router will independently acquire a set of destination routers, and limit the size of only that subset. Subsequent topology changes could then make one or more source SGM routers redundant which may in turn cause one or more of the remaining source SGM routers to exceed the limit.

Possible approaches to solving this problem are:
1. Dynamically remove one or more destination routers—not very friendly to existing users, but at least its simple! We could just use the normal algorithm of rejecting those above the threshold. Doing anything else, such as LIFO, would be difficult. Since the state for the 'old' source SGM routers will be lost, if the new set of source SGM routers has no overlap with the old set, ALL the destinations will appear to be new. The first destinations to send traces will then be (arbitrarily) accepted and the remainder rejected.

2. Allow the encoded tree size (and hence the packet size) to exceed the desirable limit—but since the number of source SGM routers is unbounded, so too is the size of the encoded tree.

3. Adjust the delivery tree to remove one or more intermediate nodes at the expense of making the delivery tree less efficient, since multiple copies of a packet would be sent over some links. In the extreme, data packets could be unicast to each delivery node, which would partially defeat the purpose of using multicast. A similar effect could be obtained by splitting the delivery tree into two (or more) parts, each of which is below the critical limit. Some intelligence into exactly which nodes to eliminate could be introduced by having the SGM trace message include the current value the ICMP message hop count for each entry (from which we can deduce the number of unicast hops corresponding to each SGM hop.) This could be used as a weighting when evaluating the modified delivery tree.

4. Communicate the number of destination nodes associated with each source SGM router and enforce a limit for the entire set.

This could perhaps be done by including the current count in the source SGM router to multicast source mtrace messages. However, this would not allow the election mechanism to be used to minimise the number of such mtrace packets. Alternatively, the source SGM routers send the number only when it changes, and it gets ACKed in the "designated" source SGM router's message. But there may be insufficient number of fields to encode all that in an ordinary mtrace packet. Further, there are numerous timing issues, which could give rise to uncertainly about the correct total.

Topology Changes with a Single Source SGM Router

Even when there is only a single source SGM router, (or where there exist multiple source SGM routers, but their sub-trees do not become merged), a topology change can potentially result in a factor of 2 (actually (2N−1)/N) increase in the size of the encoded tree. This size increase can be contained by limiting the maximum number of destination routers assuming the worst case topology. Alternatively, a more optimistic assumption about the topology can be used, and worst cases can be dealt with by using the techniques outlined above.

Effect of Tree Encoding Length on MTU

The space required in the SGM header for the encoded tree is unpredictable, and may vary during the lifetime of a group (as a result of topology changes, or joining and leaving of destinations). If the header size is kept to the minimum capable of containing the current delivery tree, then the header size, and hence the available MTU, will also vary. Conversely, if sufficient space in the header is always allocated to contain the worst case encoded tree, the MTU will remain constant, but there will be significant wasted bandwidth. The variation is approximately 5(N−1). So for N=5 it is about 20 bytes, and for N=10 about 45 bytes—a significant fraction of the total packet size for small payloads. Each node requires 4 bytes for the IP address and one byte for its tree entry, but the total length is rounded up to a 4-byte boundary.

The best compromise is to calculate MTU assuming worst case tree length, but adjust the header length to reflect the current encoded tree length requirements.

This compromise would not work if a totally unbounded extension of the header size is adopted, as suggested above to deal with merging source SGM router trees. If a totally unbounded extension of the header size is adopted, a higher upper bound could be enforced to accommodate most situations, and use one of the other techniques if the length of the header attempted to exceed the higher upper bound.

Final Hop Optimisation

The SGM tree information is never required for the final hops (that is, from the last fan out point to the delivery router—except of course for the cases where the last fan out router is a delivery router). By stripping final hop information out of the packet before the final forwarding, another 20 bytes could be saved (for the 3 way example) reducing the overhead to 24% for those hops. (The SGM type, Prot, checksum and the SA and DA. are still required, giving a 12 byte overhead=12 bytes). Such a packet shrinking operation is likely to be rather costly, but could perhaps be justified by the fact that the last hop is likely to be at the edge of the network and hence have lower bandwidth capable links.

Another way of looking at this is to say that for any particular hop, sending a single SGM packet is roughly comparable to sending 2 unicast packets (for 50 byte packets and small tree lists). So it is only on the final hops (where there would be no packet duplication even in the multiple unicast) that SGM is at a serious disadvantage. On hops which would require 3 or more unicast packets SGM almost always wins. Of course SGM can never do better than true multicast.

Separating Topology Information from Group Membership Information.

While the ability to carry both topology information and group membership information in the trace mechanism seems attractive at first sight, it leads to some unfortunate complications (such as limitations on the size of trace lists and numbers of groups reported). An alternative strategy of separating this information is explored below.

In an alternative embodiment of the invention, trace messages are per source only. Trace messages contain no group membership information.

Also, a new group membership notification (GMN) message is introduced. The new group membership notification message comes in two flavors. A complete GMN which is simply a complete list of the current group membership at that egress point (per source), and an incremental which contains a list of groups to be added and a list of those to be removed either of which may be null (analogous to a PIM join/prune).

A GMN message is normally sent by an egress, or destination, router whenever a trace ACK message is received, and the GMN message is unicast to the source router. The GMN is unicast directly to the current_source_SGM_router. If current_source_SGM_router is zero, the unicast transmission must wait until the source SGM router is known. The GMN is always sent as a "single" IP data message, fragmenting if necessary so that information about as many groups as desired is included.

An incremental GMN is sent whenever the group membership changes. Further, a complete GMN is sent whenever current_source_SGM_router changes from zero to some real value, that is whenever a successful trace-ACK is received.

GMNs are not acknowledged, but if one is lost (assuming it was an add GMN) we will fail to get data/heartbeats for that group, and hence trigger (in the first instance) a new trace, which (assuming it is successful) will cause a complete GMN to be sent—hopefully correcting the problem—if not, the sequence repeats.

If the lost GMN were a remove GMN, then we will continue to receive data/heartbeats, so this reception of heartbeats will re-trigger a GMN remove (rate limited of course). Alternatively, we could just let the heartbeat transmission die as a result of no trace packet transmission by the destination router. The trace ACK is no longer SGM unicast as in other alternative embodiments of the invention, it is just plain old unicast to the destination.

Every "n*t2" time period each egress router, i.e. destination router, checks the groups which it receives, and which are associated with each source, and if there is at least one group which hasn't received a data or heartbeat packet since the last check OR if current_source_SGM_router is zero, then the egress router sends a trace for that source, setting current_source_SGM_router to zero.

On receipt of a responsive trace ACK (with the right sequence number etc.) the destination, or egress, router sets current_source_SGM_router to the source of the ACK as before, and then the destination router sends a complete GMN to current_source_SGM_router. This GMN overrides any group state about this egress router that the source SGM router previously possessed.

Prune messages (leave and change) now only refer to the egress router as a whole and contain no group information. Arrival of a prune (of whatever flavor) at the source router removes the egress router and ALL its associated group information from the source SGM router. To simply remove a group, but continue to receive other groups the egress router sends a GMN message to the source router with the group in the prune list.

In this alternative embodiment of the invention, instead of including the group list in the trace message (and hence causing problems with size etc.) this alternative embodiment makes the group list a separate message sent in response to a trace-ACK.

With this alternative embodiment of the invention, new groups may be added without the need to send a trace message. So if a long "t1" timer is used, and the topology is reasonably stable, short duration groups may be added and removed fairly cheaply.

Active End Stations

In an alternative embodiment of the invention, the multicast source end stations execute software which does all of the tasks attributed hereinabove to the source router, including encapsulating the multicast packet in a SGM packet format. Correspondingly, the multicast destination end station executes software which does all of the tasks attributed hereinabove to the destination router, including de-encapsulation the SGM packet when it arrives at the destination end station.

In this embodiment of the invention, the trace packets are transmitted by the multicast destination end station and are received and interpreted by the multicast source end station. The multicast source end station builds the multicast delivery tree from addresses of intermediate routers carried in the address lists of the different trace packets received by the multicast source end station from different multicast destination end stations. The multicast source end station places the multicast delivery tree in the header of a SGM packet with the ordinary multicast packet as data in the SGM packet, and then transmits the SGM packet to the first hop router on the multicast delivery tree route to the intended destination end stations for the multicast group.

This embodiment of the invention requires modification of software in all multicast destination end stations, both those serving as source end stations and those serving as destination end stations. Changing software on all potential destination end stations is a daunting task, and requires either modifying the operating system running on each potential destination end station, or executing special application software to accomplish the necessary tasks.

Figure 14:
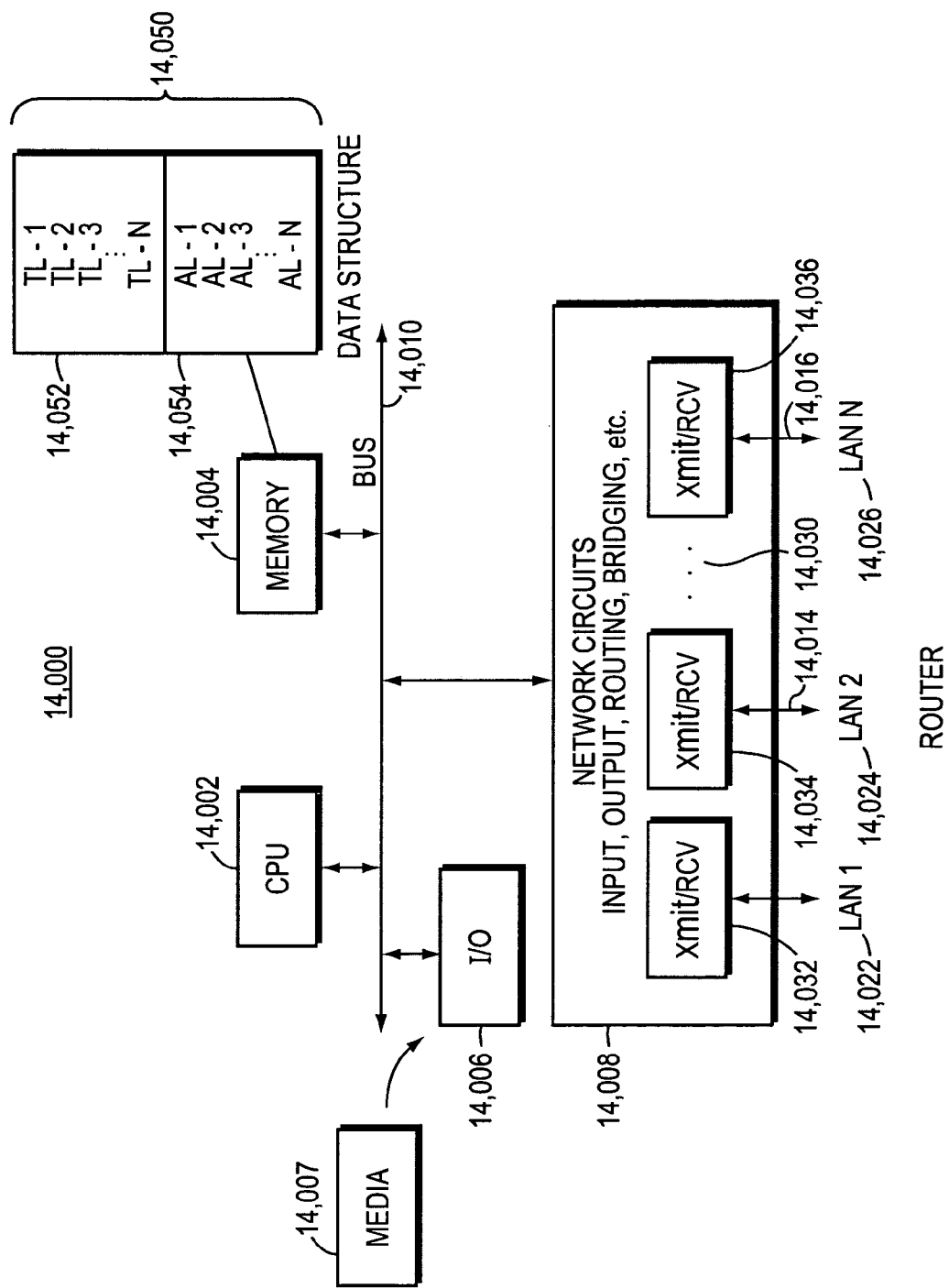
FIG. 14 is a block diagram of a router.

Turning now to FIG. 14, a block diagram of a typical network device 14,000 is shown. For example, network device 14,000 could be a router operating at layer 3, a bridge operating at layer 2, or a switch operating at any layer, including a layer 4 switch, etc. For convenience we refer to network device 14,00 as a router. Central processor unit (CPU) 14,002 manages operation of the router. Memory 14,004 holds data structures, data, and instructions useful to operation of router 14,000. Memory 14,004 may be any type of electronic memory, Random Access Memory (RAM), Read Only Memory (ROM), etc.

Input/output device 14,006 (I/O device) for example, may be a disk drive to facilitate operation of router 14,000. I/O device 14,006 is optional, and many designs of routers do not use an I/O device 14,006. I/O device 14,006 may be, for example, an internal hard disk drive or, for example, a floppy disk drive. Or as a further example, I/O device 14,006 may represent both a floppy disk drive and an internal hard disk drive. Media 14,007 may represent a removable disk for use in I/O unit 14,006 when it represents a floppy disk drive. Media 14,007 may be, for example, a standard 1.4 megabyte 3½ inch floppy disk, or for example, media 14,007 may represent any type of computer readable media. As a further example, I/O device 14,006 could also represent a tape input/output device, and media 14,007 would then represent a tape readable by the I/O device 14,006.

For example, the various tables used by router 14,000 may be stored on disk 14,006. That is, the three tables: first, the locally reachable bridge table which the bridge (or router) uses to bridge using Layer 2 frame information from one of its ports to another port, and which is used when an incoming packet has in its Layer 2 destination address an address other than the Layer 2 address of the router; second, a remotely reachable table which a peer router uses to determine which peer router it should forward an incoming frame to as an extension of its bridging function, such as use of DLSw routing protocol for a frame having a Layer 2 destination address different from the Layer 2 address of the router; and third, a routing table which the router uses for ordinary Layer 3 routing functions and which is used when an incoming packet has in its Layer 2 destination address the Layer 2 address of the router, may all be stored on a disk in I/O device 14,006. Also layer 4 switching tables may be stored to disk in I/O device 14,006. Alternatively, the tables may be maintained in memory 14,004 in the event that no disk drive is used in the router. In any event, the tables will be in memory 14,004 for use by the various bridging and routing functions of router 14,000.

Network circuit 14,008 contains the major bridging and routing circuits of router 14,000. Bus 14,010 connects the CPU 14,002, Memory 14,004, Disk (if any) 14,006, and network circuits 14,008 together so that they can exchange information by use of typical bus protocols.

Network circuit 14,008 contains the circuits responsible for input from local area networks (LANs), output to LANs, circuits for bridging of data packets, and circuits for performing routing, and possibly memory circuits to facilitate fast switching, etc. Switching is a general term used for fast transfer of packets from an input LAN to an output LAN. Particularly, bridging of packets using only Layer 2 constructs, is accomplished by network circuit 14,008. Each port 14,012, 14,014, 14,016 of router 14,000 connects to a different local area network (LAN). Layer 3 routing may be accomplished either by network circuit 14,008, or by the use of software running in CPU 14,002, or, for example, by a combination of network circuits 14,008 and software running in CPU 14,002.

For example, port 14,012 connects to a LAN designated as LAN1 14,022. Port 14,014 connects to LAN2 14,024. There may be a large number of ports, and the highest numbered port is represented as port N 14,016, where LAN N 14,026 is shown connected to port N 14,016. The three dots 14,030 indicate that network circuits 14,008 may serve many router ports. Each port is connected to its transmitter and receiver. As an example, one or more of the ports 14,012, 14,016, etc. may connect the router to a TCP/IP network cloud.

Transmitter and receiver circuit Xmit/RCV 14,032 serves port 14,012 and LAN 1 14,022. Xmit/RCV circuit 14,034 serves port 14,014 and LAN 2 14,024. There is a transmit and receive circuit for each LAN, and so correspondingly Xmit/RCV circuit 14,036 serves port N 14,016 and LAN N 14,026.

The exemplary network device 14,000 shown schematically in FIG. 14 is representative of only a very simple design of a network device. Other switching arrangements are often used in modern routers, including crossbar switches, multiple crossbar switches, etc. However, the simple schematic block diagram of FIG. 14 is meant to only represent the general operations of a network device, including a router.

The layers of the Internet Protocol communications model are implemented in various convenient hardware elements as shown in the block diagram of a router of FIG. 14. The Internet Communications model is described by Andrew Tanenbaum in his book *Computer Networks, Third Edition* published by Prentice Hall publishing company Copyright 1996, all disclosures of which are incorporated herein by reference, especially at pages 35-38. For example, depending upon the design of the router, Layer 1 and Layer 2 may be implemented in hardware in the circuits of network circuits 14,008. Alternatively, field parsing and recognition functions may be implemented in software which executes on CPU 14,002 in connection with memory 14,004. Higher layer functions such as Layer 3 Network, or Layer 4 Transport, may be implemented in software executing on CPU 14,002. Layer 4 reliable transport implemented in the transport layer is usually implemented in software executing in CPU 14,002, although even Layer 4 functions may be implemented in hardware by using an ASIC semiconductor chip.

Network device 14,000 may alternatively, be referred to as a bridge with a DLSw Layer 3 port, or as an alternative network device 14,000 may be referred to as a router, or as a still further alternative router 14,000 may be referred to as a "switch". The acronym "DLSw" stands for Data Link Switch. The term "switch" often refers to internal operation of the hardware. A switch may operate in Layer 2, Layer 3, or in layer 4. Alternatively, in hardware having router or bridge functionality, the network device 14,000 may function internally as a hardware switch. Operations requiring both bridge module and router module operation may function as a software switch, and may use function calls between the different modules. And the internal forwarding structure may be a switch, and both bridge and router modules execute in CPU 14,002. A switched LAN is described by Andrew Tanenbaum in his book *Computer Networks, Third Edition*, published by Prentice Hall, Copyright date 1996, all disclosures of which are incorporated herein by reference, particularly pages 285-287.

Data structure 14,050 is, for example, stored in memory 14,040. Data structure 14,050 has field 14,052 containing tree list1 210A, tree list2 210B, tree list3 210C, etc. as shown in FIG. 2. These tree lists are written to the header of multicast data packet 200 as shown in FIG. 2. Data structure 14,050 also has fields 14,054 containing address lists 210A, 210B, 210C, etc. Again, address lists 210A, 210B, 210C, etc. are written into the header of multicast data packet 200 by CPU 14,002 before the multicast data packet is transmitted by network circuits 14,008.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for operating a router, comprising:
receiving a packet from a source router coupled to a source end station in a computer network, the packet having an encapsulation header including one or more fields, the encapsulation header constructed by the source router to include a multicast delivery tree based on information available at the source router;
reading the multicast delivery tree from the one or more fields of the encapsulation header, the multicast delivery tree having a route to each of a plurality of destination end stations; and
forwarding the packet to an address selected in response to the multicast delivery tree.

2. The method as in claim 1, further comprising:
parsing the encapsulation header to read the multicast delivery tree.

3. The method as in claim 1, further comprising:
forwarding the packet to a neighboring router.

4. The method as in claim 1, further comprising:
forwarding the packet to an end station.

5. The method as in claim 1, further comprising:
forwarding the packet to each of a plurality of neighboring routers in the multicast delivery tree.

6. The method as in claim 1, further comprising:
encapsulating a packet forwarded to a neighboring router to enable other routers in the multicast delivery tree to parse an encapsulation header including one or more fields to determine a next hop address for the packet.

7. The method as in claim 1, further comprising:
identifying the packet as an encapsulated multicast data packet.

8. The method as in claim 1, further comprising:
identifying the packet as a small group multicast packet (SGM packet).

9. The method of claim 1, further comprising:
writing the multicast delivery tree into a data structure stored in a memory of the router.

10. The method as in claim 1, further comprising:
comparing a source address in the packet with a stored address of a correct source router; and
transmitting a prune message to the source router if the source address in the packet does not match the stored address of the correct source router.

11. The method as in claim 1, further comprising:
receiving a trace packet from a destination router in the computer network, the trace packet including an address list of intermediate routers which have routed the trace packet; and
forwarding the trace packet to the source router.

12. The method as in claim 1, further comprising:
receiving a heartbeat packet from the source router; and
forwarding the heartbeat packet to a destination router in the computer network to maintain the multicast distribution tree.

13. The method as in claim 1, further comprising:
receiving a group membership notification (GMN) packet from a destination router in the computer network, the GMN packet including information indicating current multicast group membership.

14. The method as in claim 1, wherein the packet is a small group multicast (SMG) packet which contains a data field including data from the source end station.

15. A router, comprising:
means for receiving a packet from a source router coupled to a source end station in a computer network, the packet having an encapsulation header including one or more fields, the encapsulation header constructed by the source router to include a multicast delivery tree based on information available at the source router;
means for reading the multicast delivery tree from the one or more fields of the encapsulation header, the multicast delivery tree having a route to each of a plurality of destination end stations; and
means for forwarding the packet to an address selected in response to the multicast delivery tree.

16. The router as in claim 15, further comprising:
means for parsing the encapsulation header to read the multicast delivery tree.

17. The router as in claim 15, further comprising:
means for forwarding the packet to a neighboring router.

18. The router as in claim 15, further comprising:
means for forwarding the packet to an end station.

19. The router as in claim 15, further comprising:
means for forwarding the packet to each of a plurality of neighboring routers in the multicast delivery tree.

20. The router as in claim 15, further comprising:
means for encapsulating a packet forwarded to a neighboring router to enable other routers in the multicast delivery tree to parse an encapsulation header including one or more fields to determine a next hop address for the packet.

21. The router as in claim 15, further comprising:
means for identifying the packet as an encapsulated multicast data packet.

22. The router as in claim 15, further comprising:
means for identifying the packet as a small group multicast packet (SGM packet).

23. The router of claim 15, further comprising:
means for writing the multicast delivery tree into a data structure stored in a memory of the router.

24. A router, comprising:
a receiver circuit to receive a packet from a source router coupled to a source end station in a computer network, the packet having an encapsulation header including one or more fields, the encapsulation header constructed by the source router to include a multicast delivery tree based on information available at the source router;
a network circuit to read the multicast delivery tree from the one or more fields of the encapsulation header, the multicast delivery tree having a route to each of a plurality of destination end stations; and
a transmitter circuit to forward the packet to an address selected in response to the multicast delivery tree.

25. The router as in claim 24, further comprising:
a network circuit to parse the encapsulation header to read the multicast delivery tree.

26. The router as in claim 24, further comprising:
a transmitter circuit to forward the packet to a neighboring router.

27. The router as in claim 24, further comprising:
a transmitter circuit to forward the packet to an end station.

28. The router as in claim 24, further comprising:
a transmitter circuit to forward the packet to each of a plurality of neighboring routers in the multicast delivery tree.

29. The router as in claim 24, further comprising:
a network circuit to encapsulate a packet forwarded to a neighboring router to enable other routers in the multicast delivery tree to parse an encapsulation header including one or more fields to determine a next hop address for the packet.

30. The router as in claim 24, further comprising:
a network circuit to identify the packet as an encapsulated multicast data packet.

31. The router as in claim 24, further comprising:
a network circuit to identify the packet as a small group multicast packet (SGM packet).

32. The router of claim 24, further comprising:
a processor to write the multicast delivery tree into a data structure stored in a memory of the router.

33. A computer readable media containing instructions for execution on a processor for practice of a method for operating a router, comprising the steps of:
receiving a packet from a source router coupled to a source end station in a computer network, the packet having an encapsulation header including one or more fields, the encapsulation header constructed by the source router to include a multicast delivery tree based on information available at the source router;
reading a multicast delivery tree from the one or more fields of the encapsulation header, the multicast delivery tree having a route to each of a plurality of destination end stations; and
forwarding the packet to an address selected in response to the multicast delivery tree.

34. A method, comprising:
receiving a packet transmitted from a source end station at a source router in a computer network, the packet lacking a multicast delivery tree when received;
constructing a multicast delivery tree for the packet at the source router, the multicast delivery tree constructed at the source router based on information learned from one or more trace packets received at the source router;
encapsulating the packet with an encapsulation header, at the source router, the encapsulation header to include one or more fields to store the multicast delivery tree for the packet;
reading the multicast delivery tree from the one or more fields of the encapsulation header, at a router downstream in the multicast delivery tree; and
forwarding the packet, by the router downstream in the multicast delivery tree, to an address selected in response to the multicast delivery tree.

\* \* \* \* \*

UNITED STATES PATENT AND TRADEMARK OFFICE
CERTIFICATE OF CORRECTION

PATENT NO. : 7,720,019 B2 Page 1 of 1
APPLICATION NO. : 11/342388
DATED : May 18, 2010
INVENTOR(S) : Dino Farinacci It is certified that error appears in the above-identified patent and that said Letters Patent is hereby corrected as shown below:

Col. 2, Line 21, please amend as shown:

group[[ is]] multicast packet, or SGM packet. Routers which are

Col. 2, Line 22, please amend as shown:

neither branch points of the[[,]] delivery tree nor destination

Col. 7, Line 12, please amend as shown:

capable router performs the[[ is]] following actions.

Col. 19, Line 9, please amend as shown:

tree. In addition[[;]], it ceases transmitting downstream heartbeat

Col. 24, Line 1, please amend as shown:

source SGM router[[,]] are affected. Where the path from the

Col. 26, Line 12, please amend as shown:

'small' group. However, the[[ to]] limiting factor is not the size of

Signed and Sealed this

Thirteenth Day of July, 2010

David J. Kappos
*Director of the United States Patent and Trademark Office*